United States Patent
Kawai et al.

(10) Patent No.: US 8,038,817 B2
(45) Date of Patent: Oct. 18, 2011

(54) OPENING-SEALING APPARATUS FOR HONEYCOMB MOLDED BODY, OPENING-SEALING APPARATUS FOR HONEYCOMB FIRED BODY, METHOD OF FILLING PLUG MATERIAL PASTE, AND METHOD OF MANUFACTURING HONEYCOMB STRUCTURED BODY

(75) Inventors: Tsuyoshi Kawai, Gifu (JP); Eiji Sumiya, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 373 days.

(21) Appl. No.: 11/645,544

(22) Filed: Dec. 27, 2006

(65) Prior Publication Data

US 2007/0199643 A1     Aug. 30, 2007

(30) Foreign Application Priority Data

Feb. 24, 2006   (WO) .................. PCT/JP2006/303479

(51) Int. Cl.
  *C04B 33/34*  (2006.01)
  *C03B 29/00*  (2006.01)
(52) U.S. Cl. .................. 156/89.22; 156/89.11
(58) Field of Classification Search ............... 156/89.22
  See application file for complete search history.

(56) References Cited

U.S. PATENT DOCUMENTS

| | | | |
|---|---|---|---|
| 4,357,257 A * | 11/1982 | Wu et al. ................ | 516/31 |
| 5,364,573 A | 11/1994 | Noky | |
| 5,495,872 A * | 3/1996 | Gallagher et al. ............ | 138/44 |
| 5,914,187 A | 6/1999 | Naruse et al. | |
| 6,669,751 B1 | 12/2003 | Ohno et al. | |
| 7,112,233 B2 | 9/2006 | Ohno et al. | |

(Continued)

FOREIGN PATENT DOCUMENTS

EP   1 586 431 A1   10/2005

(Continued)

OTHER PUBLICATIONS

Tomita et al., "Effect of Temperature on the Slurry Characteristics and Green Bodies of Alumina," Journal of the American Ceramic Society, vol. 78 Issue 8, pp. 2153-2156, Apr. 29, 1995.*

(Continued)

*Primary Examiner* — Philip C Tucker
*Assistant Examiner* — Alex Efta
(74) *Attorney, Agent, or Firm* — Finnegan, Henderson, Farabow, Garrett & Dunner, LLP

(57) ABSTRACT

An opening-sealing apparatus for a honeycomb molded body comprising:
  a paste filling device equipped with a paste filling unit having an opening-sealing mask in which a number of openings are formed at predetermined positions and a paste supplying unit;
  an image pickup device for picking up an image of the end face of the honeycomb molded body; and
  an image analyzing device for analyzing the image obtained by the image pickup device, wherein
  the image analyzing device analyzes the positions of the cells based upon the image of the end face picked up by the image pickup device; the opening-sealing mask is made in contact with the end face of the honeycomb molded body in such a manner that the positional error between the openings of the opening-sealing mask and the cells of the honeycomb molded body is reduced to a minimal level; and the plug material paste, which has been supplied from the paste supplying unit to the paste filling unit, is injected through the opening-sealing mask and filled in the end portion of the cells.

30 Claims, 10 Drawing Sheets

U.S. PATENT DOCUMENTS

| | | | |
|---|---|---|---|
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2002/0020944 A1* | 2/2002 | Yamaguchi et al. | 264/400 |
| 2003/0003851 A1* | 1/2003 | Cann et al. | 451/44 |
| 2003/0162883 A1* | 8/2003 | Fabian et al. | 524/494 |
| 2004/0071932 A1* | 4/2004 | Ishihara et al. | 428/116 |
| 2004/0161596 A1 | 8/2004 | Taoka et al. | |
| 2005/0109023 A1 | 5/2005 | Kudo et al. | |
| 2005/0153099 A1 | 7/2005 | Yamada | |
| 2005/0161148 A1* | 7/2005 | Fukuta et al. | 156/89.22 |
| 2005/0169819 A1 | 8/2005 | Shibata | |
| 2005/0175514 A1 | 8/2005 | Ohno | |
| 2005/0180898 A1 | 8/2005 | Yamada | |
| 2005/0247038 A1 | 11/2005 | Takahashi | |
| 2005/0272602 A1 | 12/2005 | Ninomiya | |
| 2006/0029897 A1 | 2/2006 | Saijo et al. | |
| 2006/0029898 A1 | 2/2006 | Saijo et al. | |
| 2006/0043562 A1 | 3/2006 | Watanabe | |
| 2006/0051556 A1 | 3/2006 | Ohno et al. | |
| 2006/0073970 A1 | 4/2006 | Yamada | |
| 2006/0108347 A1 | 5/2006 | Koyama et al. | |
| 2006/0118546 A1 | 6/2006 | Saijo | |
| 2006/0166820 A1 | 7/2006 | Ogyu et al. | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0230732 A1 | 10/2006 | Kunieda | |
| 2006/0245465 A1 | 11/2006 | Saijo et al. | |
| 2006/0269722 A1 | 11/2006 | Yamada | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0068128 A1 | 3/2007 | Oshimi et al. | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0169453 A1 | 7/2007 | Hayakawa | |
| 2007/0175060 A1 | 8/2007 | Idei et al. | |
| 2007/0178275 A1 | 8/2007 | Takahashi | |
| 2007/0190350 A1 | 8/2007 | Ohno et al. | |
| 2007/0196620 A1 | 8/2007 | Ohno et al. | |
| 2007/0199205 A1 | 8/2007 | Hoshino et al. | |
| 2007/0204580 A1 | 9/2007 | Kunieda | |
| 2007/0212517 A1 | 9/2007 | Ohno et al. | |
| 2007/0235895 A1 | 10/2007 | Yamamura et al. | |
| 2007/0243283 A1 | 10/2007 | Yamamura et al. | |
| 2007/0262497 A1 | 11/2007 | Yamamura et al. | |
| 2007/0262498 A1 | 11/2007 | Saijo et al. | |
| 2007/0277655 A1 | 12/2007 | Kawai et al. | |
| 2007/0293392 A1 | 12/2007 | Ohno et al. | |
| 2008/0067725 A1 | 3/2008 | Naruse et al. | |
| 2008/0084010 A1 | 4/2008 | Naruse et al. | |
| 2008/0088072 A1 | 4/2008 | Kobayashi et al. | |
| 2008/0106008 A1 | 5/2008 | Kasai et al. | |
| 2008/0106009 A1 | 5/2008 | Naruse et al. | |
| 2008/0111274 A1 | 5/2008 | Kawai et al. | |
| 2008/0115597 A1 | 5/2008 | Ohno et al. | |
| 2008/0116200 A1 | 5/2008 | Kawai et al. | |
| 2008/0116601 A1 | 5/2008 | Naruse et al. | |
| 2008/0120950 A1 | 5/2008 | Ohno et al. | |
| 2008/0136053 A1 | 6/2008 | Kuribayashi et al. | |
| 2008/0136062 A1 | 6/2008 | Kasai et al. | |
| 2008/0138567 A1 | 6/2008 | Ninomiya et al. | |
| 2008/0150200 A1 | 6/2008 | Tajima | |
| 2008/0157445 A1 | 7/2008 | Kawai et al. | |
| 2008/0160249 A1 | 7/2008 | Makino | |
| 2008/0174039 A1 | 7/2008 | Saijo et al. | |
| 2008/0179781 A1 | 7/2008 | Iwata et al. | |
| 2008/0190081 A1 | 8/2008 | Oshimi | |
| 2008/0190083 A1 | 8/2008 | Oshimi | |
| 2008/0213485 A1 | 9/2008 | Shibata | |
| 2008/0236115 A1 | 10/2008 | Sakashita | |
| 2008/0236122 A1 | 10/2008 | Ito | |
| 2008/0236724 A1 | 10/2008 | Higuchi | |
| 2008/0241015 A1 | 10/2008 | Kudo et al. | |
| 2008/0241444 A1 | 10/2008 | Oshimi | |
| 2008/0241466 A1 | 10/2008 | Saito et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |

FOREIGN PATENT DOCUMENTS

| | | | |
|---|---|---|---|
| EP | 1586431 A1 * | 10/2005 | |
| JP | 5-253419 | 10/1993 | |
| JP | 6-39219 | 2/1994 | |
| JP | 07-213829 | 8/1995 | |
| JP | 07213829 A * | 8/1995 | |
| JP | 10-337427 | 12/1998 | |
| JP | 10337427 A * | 12/1998 | |
| JP | 2000-190312 | 7/2000 | |
| JP | 2001-1326 | 1/2001 | |
| JP | 2001-1332 | 1/2001 | |
| JP | 2002-028499 | 1/2002 | |
| JP | 2003-285313 | 10/2003 | |
| JP | 2004154718 A * | 6/2004 | |
| WO | WO 2004/050318 A1 | 6/2004 | |
| WO | WO 2004050318 A1 * | 6/2004 | |

OTHER PUBLICATIONS

Ramsey, J.B, "Test for Specification errors in Classical Linear Least-squares Regression Annalysis," Journal of the Royal Statistical Society, Series B, vol. 31, No. 2, (1969), pp. 350-371.*

Yamada, Y., "Die for Extrusion-Molding and Method for Manufacturing Porous Ceramic Member," U.S. Appl. No. 11/541,724, filed Oct. 3, 2006.

Saijo, T. et al., "Degreasing Jig, Method for Degreasing Ceramic Molded Body, and Method for Manufacturing Honeycomb Structured Body," U.S. Appl. No. 11/604,682, filed Nov. 28, 2006.

Yamamura, N. et al., "Method for Manufacturing Honeycomb Structured Body and Honeycomb Structured Body," U.S. Appl. No. 11/606,167, filed Nov. 30, 2006.

Saijo, T. et al., "Firing Furnace, Manufacturing Method of a Ceramic Member Using the Firing Furnace, Ceramic Member, and Ceramic Honeycomb Filter," U.S. Appl. No. 11/174,483, filed Jul. 6, 2005.

Yamada, H. et al., "Transporting Apparatus and Method for Manufacturing Honeycomb Structured Body," U.S. Appl. No. 11/638,433, filed Dec. 14, 2006.

Kawai, T. et al., "Cutting Apparatus, Honeycomb Molded Body Cutting Method, and Honeycomb Structure Manufacturing Method," U.S. Appl. No. 11/513,115, filed Aug. 31, 2006.

Kawai, T. et al., "End Face Processing Apparatus, End Face Processing System, End Face Processing Method for Honeycomb Molded Body, and Manufacturing Method for Honeycomb Structure," U.S. Appl. No. 11/546,417, filed Oct. 12, 2006.

Hoshino, T. et al., "End-Face Heating Apparatus, End-Face Drying Method for Honeycomb Aggregated Body, and Method for Manufacturing Honeycomb Structured Body," U.S. Appl. No. 11/606,173, filed Nov. 30, 2006.

Naruse, K. et al., "Method for Mixing Powder, Agitation Apparatus, and Method for Manufacturing Honeycomb Structured Body," U.S. Appl. No. 11/636,460, filed Dec. 11, 2006.

U.S. Appl. No. 11/845,975.
U.S. Appl. No. 11/867,256.
U.S. Appl. No. 11/711,021.
U.S. Appl. No. 11/951,949.

* cited by examiner

A-A line cross-sectional view

B-B line cross-sectional view

OPENING-SEALING APPARATUS FOR HONEYCOMB MOLDED BODY, OPENING-SEALING APPARATUS FOR HONEYCOMB FIRED BODY, METHOD OF FILLING PLUG MATERIAL PASTE, AND METHOD OF MANUFACTURING HONEYCOMB STRUCTURED BODY

CROSS-REFERENCE TO RELATED APPLICATIONS

This application claims priority of PCT/JP2006/303479 filed on Feb. 24, 2006. The contents of this application are incorporated herein by reference in their entirety.

BACKGROUND OF THE INVENTION

1. Field of the Invention

The present invention relates to an opening-sealing apparatus for a honeycomb molded body, an opening-sealing apparatus for a honeycomb fired body, a method of filling a plug material paste, and a method of manufacturing a honeycomb structured body.

2. Discussion of the Background

In recent years, particulates such as soot and the like contained in exhaust gases discharged from internal combustion engines of vehicles, such as buses and trucks, and construction machines, have raised serious problems as those particulates are harmful to the environment and the human body.

There have been proposed various honeycomb filters using a honeycomb structured body comprised of porous ceramics, which serve as filters capable of capturing particulates in exhaust gases to purify the exhaust gases.

FIG. 1 is a perspective view that schematically shows one example of such honeycomb filters; FIG. 2A is a perspective view that schematically shows a honeycomb fired body that constitutes the honeycomb filter; and FIG. 2B is a cross-sectional view taken along line A-A of FIG. 2A.

In a honeycomb filter 130, a plurality of honeycomb fired bodies 140 as shown in FIGS. 2A and 2B are bonded to one another by interposing sealing material layers (adhesive layers) 131 to form a ceramic block 133, and a sealing material layer (coat layer) 132 is formed on the periphery of this ceramic block 133.

Moreover, as shown in FIGS. 2A and 2B, the honeycomb fired body 140 has a structure in which a number of cells 141 are placed in parallel with one another in the longitudinal direction and a cell wall 143 interposed between the cells 141 is allowed to function as a filter.

In other words, as shown in FIG. 2B, each of the cells 141, formed in the honeycomb fired body 140, is sealed by an opening-sealing material layer 142 at either one end of its exhaust gas-inlet or exhaust gas-outlet sides so that exhaust gases that flow into one of cells 141 are discharged from another cell 141 after surely passing through a cell wall 143 interposed between cells 141, and accordingly, when exhaust gases pass through the cell wall 143, particulates are captured by the cell wall 143 portion so that the exhaust gases are purified.

Conventionally, in order to manufacture a honeycomb filter 130 of this type, first, for example, ceramic powder, a binder, a dispersant solution and the like are mixed to prepare a wet mixture. This mixture is then continuously extrusion-molded through a die, and the extruded molded body is cut into a predetermined length to manufacture a pillar-shaped honeycomb molded body.

Then, end portions of this honeycomb molded body are sealed, in a checkered pattern, with a plug material paste mainly comprising the above-mentioned ceramic particles, and the resulting product is subjected to degreasing and firing processes to manufacture a honeycomb fired body 140 (see FIGS. 2A and 2B). With respect to the method of filling the cells of the honeycomb molded body with the plug material paste, for example, methods disclosed in JP-A2000-190312, JP-A2001-1332, and JP-A2001-1326 may be used.

Thereafter, a sealing material paste is applied to side faces of the honeycomb fired bodies and the honeycomb fired bodies are bonded to one another by an adhesive to manufacture an aggregated body of honeycomb fired bodies in which a number of the honeycomb fired bodies are bonded to one another by interposing a sealing material layer (adhesive layer). Next, the resulting aggregated body of the honeycomb fired bodies is cut and machined into a predetermined shape such as a cylindrical shape and a cylindroid shape by using a cutting machine and the like to form a ceramic block, and lastly, a sealing material paste is applied to the periphery of the ceramic block to form a sealing material layer (coat layer), thereby completing the manufacturing process of a honeycomb filter.

With respect to a method of filling predetermined cells of the honeycomb molded body with the plug material paste in a manufacturing method of this type, for example, a method disclosed in JP-A 2003-285313 may be used, in addition to the above-mentioned method. JP-A 2003-285313 has disclosed a method of filling cells with a plug material paste in which: a reference cell having a different opening shape is preliminarily formed in a honeycomb molded body and the image of the end face of the honeycomb molded body is picked up to specify the position of the cell opening based upon the reference cell, and a plug material paste is filled in through an opening-sealing mask.

The contents of JP-A 2000-190312, JP-A 2001-1332, JP-A 2001-1326 and JP-A 2003-285313 are incorporated herein by reference in their entirety.

SUMMARY OF THE INVENTION

The opening-sealing apparatus for a honeycomb molded body according to embodiments of the present invention is an opening-sealing apparatus for a honeycomb molded body, which is used for sealing, with a plug material paste, either one of the end portions of each of a number of cells placed in a pillar-shaped honeycomb molded body in parallel in a longitudinal direction with a cell wall therebetween, comprising:

a paste filling device equipped with a paste filling unit having an opening-sealing mask in which a number of openings are formed at predetermined positions and a paste supplying unit which supplies a plug material paste to the paste filling unit;

an image pickup device for picking up an image of the end face of the honeycomb molded body; and an image analyzing device for analyzing the image obtained by the image pickup device, wherein the image analyzing device analyzes the positions of the cells based upon the image of the end face picked up by the image pickup device; the opening-sealing mask is made in contact with the end face of the honeycomb molded body in such a manner that the positional error between the openings of the opening-sealing mask and the cells of the honeycomb molded body is reduced to a minimal level; and the plug material paste, which has been supplied from the paste supplying unit to the paste filling unit, is injected through the opening-sealing mask to fill in the end portion of the cells.

In the above-mentioned opening-sealing apparatus for a honeycomb molded body, the paste filling device is preferably equipped with a temperature control mechanism used for controlling the temperature of the plug material paste. Also, the paste filling unit of the paste filling device is preferably equipped with a flow regulating plate.

More preferably, the flow regulating plate does not have an opening in the center, and it is more preferable that the openings formed at relatively lower positions of the flow regulating plate have smaller diameters than those of openings formed at relatively higher positions.

Also, in the above-mentioned opening-sealing apparatus for a honeycomb molded body, the opening of the opening-sealing mask is preferably smaller than the opening of the cells of the honeycomb molded body.

In addition, the shape or the opening of the opening-sealing mask is more preferably a round shape.

In the above-mentioned opening-sealing apparatus for a honeycomb molded body, it is preferable that a filter is interposed between the paste filling unit and the paste supplying unit. It is more preferable that the paste filling unit and the paste supplying unit are connected to each other by a plug material paste-supplying pipe, and the plug material paste-supplying pipe is equipped with a filter inside.

Moreover, the opening-sealing apparatus for a honeycomb molded body preferably further comprises a rotary table for shifting the honeycomb molded body.

An opening-sealing apparatus for a honeycomb fired body according to the embodiments of the present invention is used for sealing, with a plug material paste, either one of the end portions of each of a number of cells placed in a pillar-shaped honeycomb fired body in parallel in a longitudinal direction with a cell wall therebetween, and comprises:

a paste filling device equipped with a paste filling unit having an opening-sealing mask in which a number of openings are formed at predetermined positions and a paste supplying unit which supplies a plug material paste to the paste filling unit;

an image pickup device for picking up an image of the end face of the honeycomb fired body; and an image analyzing device for analyzing the image obtained by the image pickup device, wherein the image analyzing device analyzes the positions of the cells based upon the image of the end face picked up by the image pickup device, the opening-sealing mask is made in contact with the end face of the honeycomb fired body in such a manner that the positional error between the openings of the opening-sealing mask and the cells of the honeycomb fired body is reduced to a minimal level, and the plug material paste, which has been supplied from the paste supplying unit to the paste filling unit, is injected through the opening-sealing mask to fill in the end portion of the cells.

The opening-sealing apparatus for a honeycomb fired body according to the embodiments of the present invention is desirably the same apparatus as the opening-sealing apparatus for a honeycomb molded body according to the embodiments of the present invention.

The method of filling a plug material paste according to embodiments of the present invention is a method of filling a plug material paste, comprising injecting a plug material paste to fill in either one of the end portions of each of a number of cells placed in a pillar-shaped honeycomb molded body in parallel in a longitudinal direction with a cell wall therebetween by using an opening-sealing apparatus, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb molded body; and an image analyzing device for analyzing the image obtained by the image pickup device, the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

In the above-mentioned method of filling a plug material paste, the paste filling device is preferably equipped with a temperature control mechanism used for controlling the temperature of the plug material paste. Also, the paste filling unit of the paste filling device is preferably equipped with a flow regulating plate.

More preferably, the flow regulating plate does not have an opening in the center, and it is more preferable that the openings formed at relatively lower positions of the flow regulating plate have smaller diameters than those of openings formed at relatively higher positions.

Moreover, in the method of filling a plug material paste, the opening of the opening-sealing mask is preferably smaller than the opening of the cells of the honeycomb molded body. Furthermore, the opening area of the opening-sealing mask is preferably set to at least about 5% and at most about 35% of the opening area of the cells of the honeycomb molded body.

More preferably, the shape of the opening of the opening-sealing mask is a round shape.

In the method of filling a plug material paste, it is preferable that a filter is interposed between the paste filling unit and the paste supplying unit. It is more preferable that the paste filling unit and the paste supplying unit are connected to each other by a plug material paste-supplying pipe, and the plug material paste-supplying pipe is equipped with a filter inside.

Moreover, in the method of filling a plug material paste, the opening-sealing apparatus preferably further comprises a rotary table for shifting the honeycomb molded body.

A method of filling a plug material paste according to the embodiments of the present invention comprises injecting a plug material paste to fill in either one of the end portions of each of a number of cells placed in a pillar-shaped honeycomb fired body in parallel in a longitudinal direction with a cell wall therebetween by using an opening-sealing apparatus, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb fired body; and an image analyzing device for analyzing the image obtained by the image pickup device, the image analyzing device analyzes the positions of the cells based upon the image of the end face, picked up by the image pickup device, the opening-sealing mask is made in contact with the end face of the honeycomb fired body in such a manner that the positional error between the openings of the opening-sealing mask and the cells of the honeycomb fired body is reduced to a minimal level, and the plug material paste, which has been supplied from the paste supplying unit to the paste filling unit, is injected through the opening-sealing mask to fill in the end portion of the cells.

Moreover, in the method of filling a plug material paste according to the embodiments of the present invention, it is desirable that the plug material paste is filled into the cells of the honeycomb fired body using the same method as the method of filling a plug material paste according to the embodiments of the present invention in which the plug material paste is filled into the cells of the honeycomb molded body.

The method of manufacturing a honeycomb structured body according to embodiments of the present invention comprises: molding a ceramic material to manufacture a pillar-shaped honeycomb molded body in which a number of cells are placed in parallel in a longitudinal direction with a partition wall therebetween; injecting a plug material paste to fill in either of the end portions of the cells by an opening-sealing apparatus; and firing the honeycomb molded body to manufacture a honeycomb structured body having the resulting honeycomb fired body, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb molded body; and an image analyzing device for analyzing the image obtained by the image pickup device, the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

In the above-mentioned method of manufacturing a honeycomb structured body, the paste filling device is preferably equipped with a temperature control mechanism used for controlling the temperature of the plug material paste. Also, the paste filling unit of the paste filling device is preferably equipped with a flow regulating plate.

Moreover, the flow regulating plate, more preferably, does not have an opening in the center, and it is more preferable that the openings formed at relatively lower positions of the flow regulating plate have smaller diameters than those of openings formed at relatively higher positions.

Moreover, in the above-mentioned method of manufacturing a honeycomb structured body, the opening of the opening-sealing mask is preferably smaller than the opening of the cells of the honeycomb molded body. Furthermore, the opening area of the opening-sealing mask is preferably set to at least about 5% and at most about 35% of the opening area of the cells of the honeycomb molded body.

More preferably, the shape of the opening of the opening-sealing mask is a round shape.

In the above-mentioned method of manufacturing a honeycomb structured body, it is preferable that a filter is interposed between the paste filling unit and the paste supplying unit. It is more preferable that the paste filling unit and the paste supplying unit are connected to each other by a plug material paste-supplying pipe, and the plug material paste-supplying pipe is equipped with a filter inside.

Moreover, in the above-mentioned method of manufacturing a honeycomb structured body, the opening-sealing apparatus preferably further comprises a rotary table for shifting the honeycomb molded body.

A method of manufacturing a honeycomb structured body according to the embodiments of the present invention comprises:

molding a ceramic material to manufacture a pillar-shaped honeycomb molded body in which a number of cells are placed in parallel in a longitudinal direction with a partition wall therebetween;

firing the honeycomb molded body to manufacture a honeycomb fired body;

injecting a plug material paste to fill in either of the end portions of the cells by an opening-sealing apparatus; and further firing or drying the honeycomb fired body to manufacture a honeycomb structured body comprising the resulting honeycomb fired body, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb molded body; and an image analyzing device for analyzing the image obtained by the image pickup device, the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

In the method for manufacturing a honeycomb structured body according to the embodiments of the present invention, desirably, the plug material paste is filled into the cells of the honeycomb fired body using the method of filling a plug material paste according to the embodiments of the present invention.

Further, desirably, the method for manufacturing a honeycomb structured body further comprises binding a plurality of the honeycomb fired bodies by interposing an adhesive layer.

In the method for manufacturing a honeycomb structured body the honeycomb structured body is desirably formed by one honeycomb fired body.

BRIEF DESCRIPTION OF THE DRAWINGS

FIG. 3-1B is a cross-sectional view taken along line B-B of FIG. 3-1A.

FIG. 3-2 is a cross-sectional view that shows another example of the honeycomb molded body according to one embodiment of the present invention which is filled with a plug material paste.

DESCRIPTION OF THE EMBODIMENTS

Figure 1:
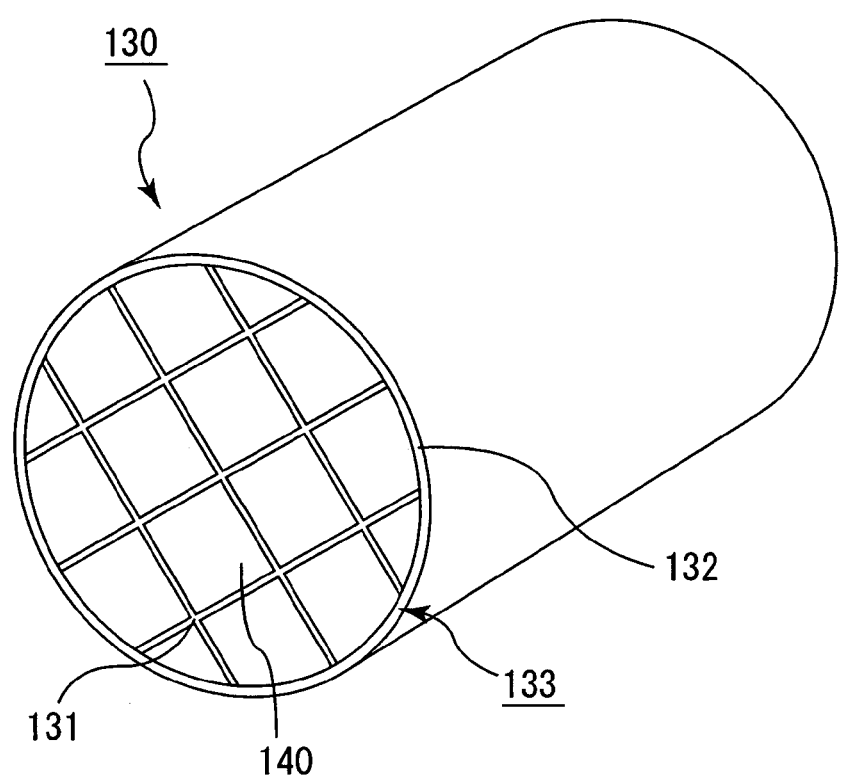
FIG. 1 is a perspective view that schematically shows one example of a conventional honeycomb filter.

First, referring to the drawings, the following description will discuss an opening-sealing apparatus for a honeycomb molded body according to embodiments of the present invention and a method of filling a plug material paste according to embodiments of the present invention.

The opening-sealing apparatus for a honeycomb molded body according to one embodiment of the present invention is an opening-sealing apparatus for a honeycomb molded body, which is used for sealing, with a plug material paste, either one of the end portions of each of a number of cells placed in a pillar-shaped honeycomb molded body in parallel in a longitudinal direction with a cell wall therebetween, comprising:

a paste filling device equipped with a paste filling unit having an opening-sealing mask in which a number of openings are formed at predetermined positions and a paste supplying unit which supplies a plug material paste to the paste filling unit;

an image pickup device for picking up an image of the end face of the honeycomb molded body; and an image analyzing device for analyzing the image obtained by the image pickup device, wherein the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

Moreover, the method of filling a plug material paste according to one embodiment of the present invention is a method of filling a plug material paste comprising injecting a plug material paste to fill in either one of the end portions of each of the number of cells placed in a pillar-shaped honeycomb molded body in parallel in a longitudinal direction with a cell wall therebetween by using an opening-sealing apparatus, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb molded body; and an image analyzing device for analyzing the image obtained by the image pickup device, the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

Therefore, in the method of filling a plug material paste according to embodiments of the present invention, the opening-sealing apparatus for a honeycomb molded body according to embodiments of the present invention can be preferably used as an opening-sealing apparatus used in the method.

In the present specification, the shape indicated by the word "pillar" refers to any desired shape of a pillar including a round pillar, an oval pillar, a polygonal pillar and the like.

First, the following description will discuss a honeycomb molded body which is to be filled with a plug material paste by using the opening-sealing apparatus for a honeycomb molded body according to one embodiment of the present invention and a method of filling a plug material paste according to one embodiment of the present invention.

Figures 1A, 3:
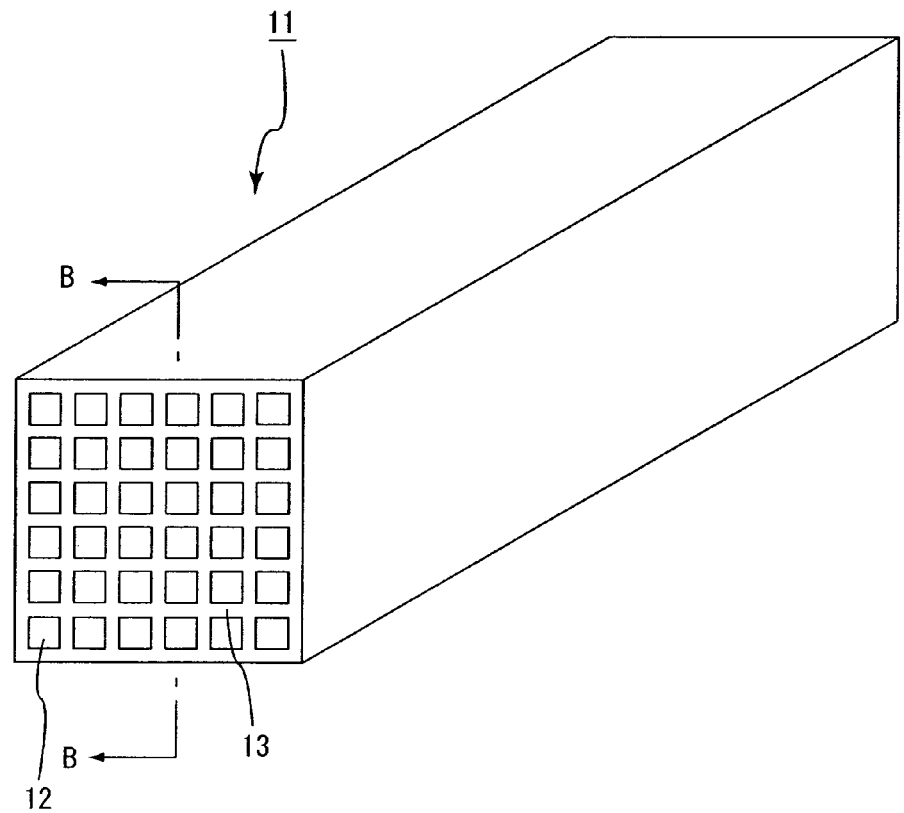
FIG. 3-1A is a perspective view that shows one example of a honeycomb molded body according to one embodiment of the present invention which is filled with a plug material paste.
Figures 1B, 3:
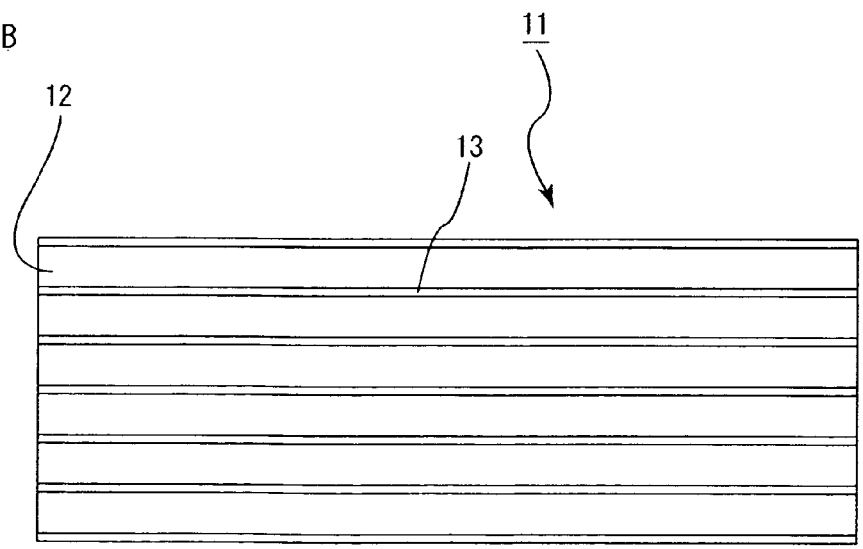

FIG. 3-1A is a perspective view that shows one example of a honeycomb molded body which is to be filled with a plug material paste, and FIG. 3-1B is a cross-sectional view taken along line B-B of FIG. 3-1A.

Examples of the honeycomb molded body include a square pillar-shaped honeycomb molded body 11 and the like, as shown in FIGS. 3-1A and 3-1B, in which a number of cells 12 are placed in parallel in a longitudinal direction with a cell wall 13 therebetween.

The honeycomb molded body 11 mainly comprises ceramic powder and an organic binder.

Examples of the material of the ceramic powder include, although not particularly limited, silicon carbide; nitride ceramics such as aluminum nitride, silicon nitride, boron nitride and titanium nitride; carbide ceramics such as zirconium carbide, titanium carbide, tantalum carbide and tungsten carbide; and oxide ceramics such as alumina, zirconia, cordierite, mullite and aluminum titanate; and the like.

Here, a silicon-containing ceramic which is formed by blending a metallic silicon with each of the above-mentioned ceramics, a ceramic material which is combined by silicon or a silicate compound, and the like may be exemplified as a main component, and, for example, a mixture of silicon carbide and a metallic silicon is also preferably used.

Although the external shape of a honeycomb molded body shown in FIGS. 3-1A and 3-1B is a square pillar-shape, the external shape of the honeycomb molded body, which is to be filled with the plug material paste, is not particularly limited to the square pillar-shape and may be, for example, another pillar shape such as a triangular pillar shape or a hexagonal pillar shape, or a cylindrical shape.

Moreover, in the honeycomb molded body shown in FIGS. 3-1A and 3-1B, the shape of each cell is the same, however, the shape of cells, which are placed in parallel with one another in the honeycomb molded body which is to be filled with the plug material paste, is not particularly limited to the shape shown in FIGS. 3-1A and 3-1B, and several kinds of cells having different shapes may be placed in parallel with one another. More specifically, as indicated by a honeycomb molded body 21 shown in FIG. 3-2, large cells 22a each having a relatively large area on the cross section perpendicular to the longitudinal direction and an octagonal shape in its cross section, and small cells 22b each having a relatively small area on the cross section perpendicular to the longitudinal direction and a tetragonal shape in its cross section, may be placed in parallel with one another. It goes without saying that cells having another cross-sectional shape may be placed in parallel with one another.

Figures 2, 3:
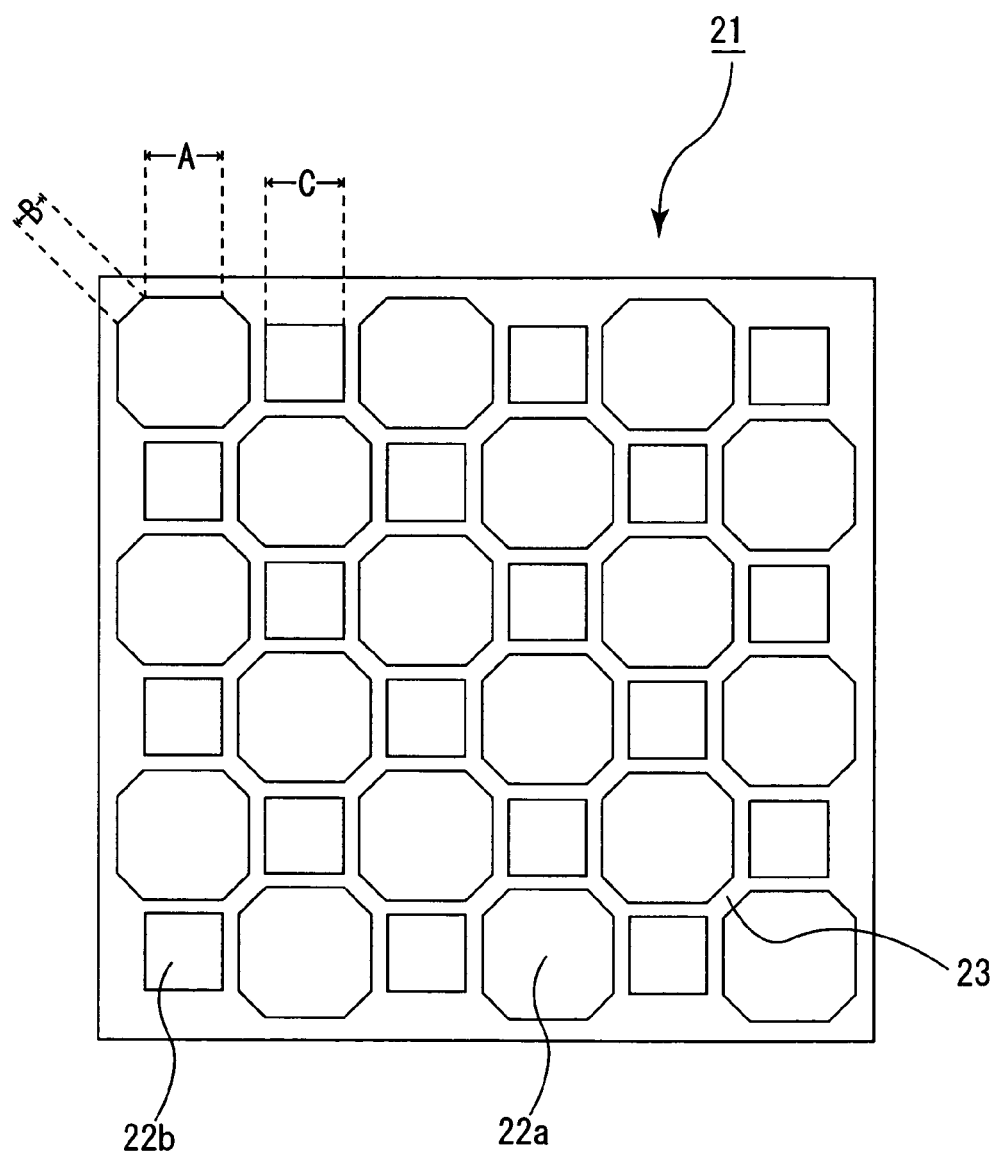

FIG. 3-2 is a cross-sectional view that shows another example of a honeycomb molded body according to one embodiment of the present invention which is to be filled with the plug material paste. In FIG. 3-2, reference numeral 23 represents a cell wall.

When a honeycomb structured body, manufactured by using honeycomb molded bodies each having large cells with a relatively large cross-sectional area and small cells with a relatively small cross-sectional area as shown in FIG. 3-2, is used as a honeycomb filter, and the large cells are used for the flow-in side of exhaust gases and the small cells are used for the flow-out side of exhaust gases, the limit of particulate capturing amount is increased so that, for example, the duration before the regenerating process of the honeycomb filter may be prolonged more easily.

The following description will discuss the opening-sealing apparatus for a honeycomb molded body according to one embodiment of the present invention.

Figure 4:
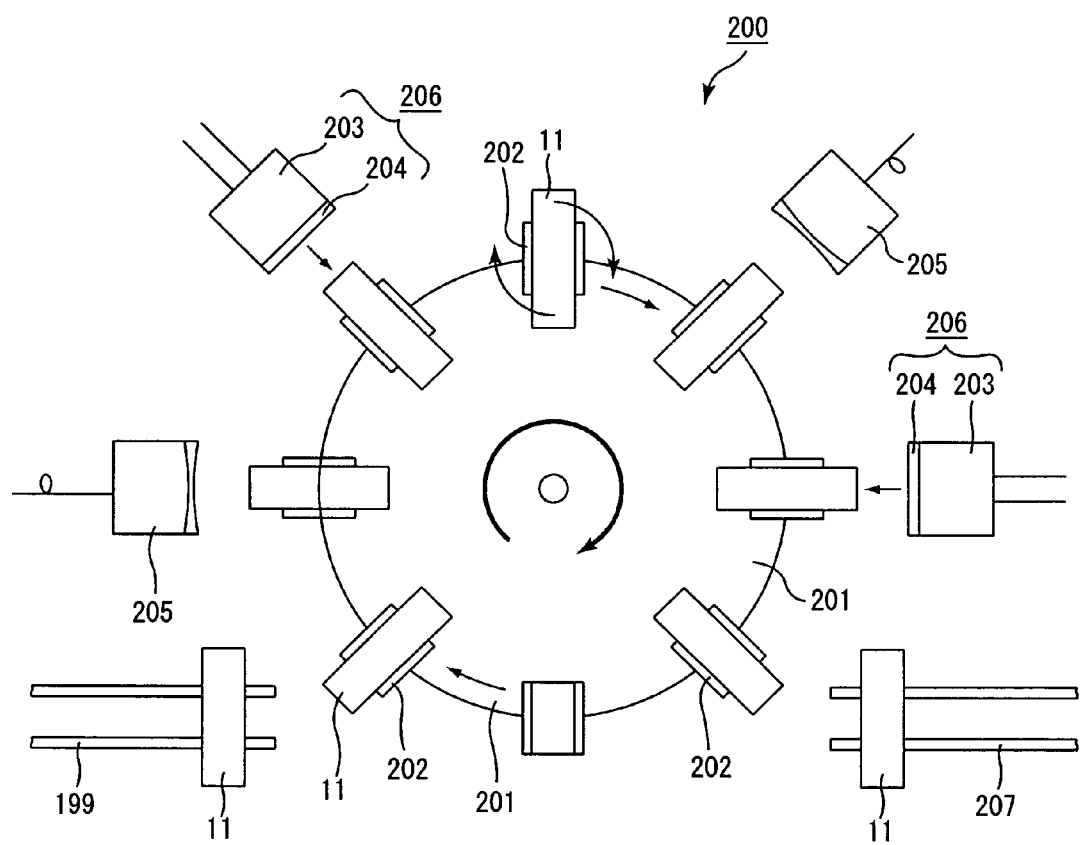
FIG. 4 is a conceptual view that schematically shows one example of an opening-sealing apparatus for a honeycomb molded body according to one embodiment of the present invention.
Figure 5A:
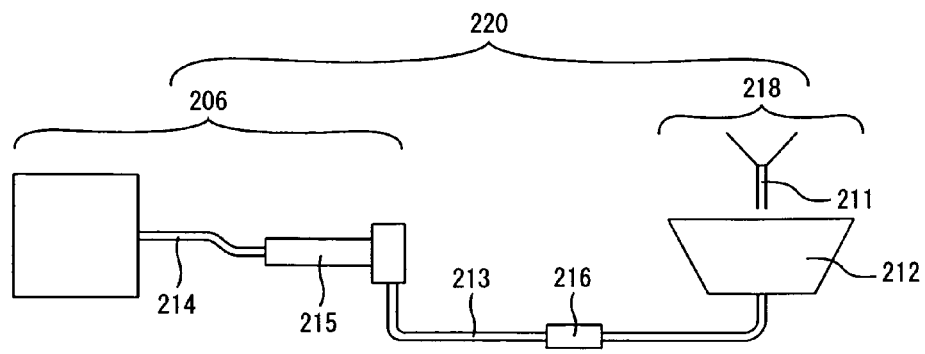
FIG. 5A is a conceptual view that schematically shows one example of a paste filling device that constitutes an opening-sealing apparatus for a honeycomb molded body according to one embodiment of the present invention.
Figure 5B:
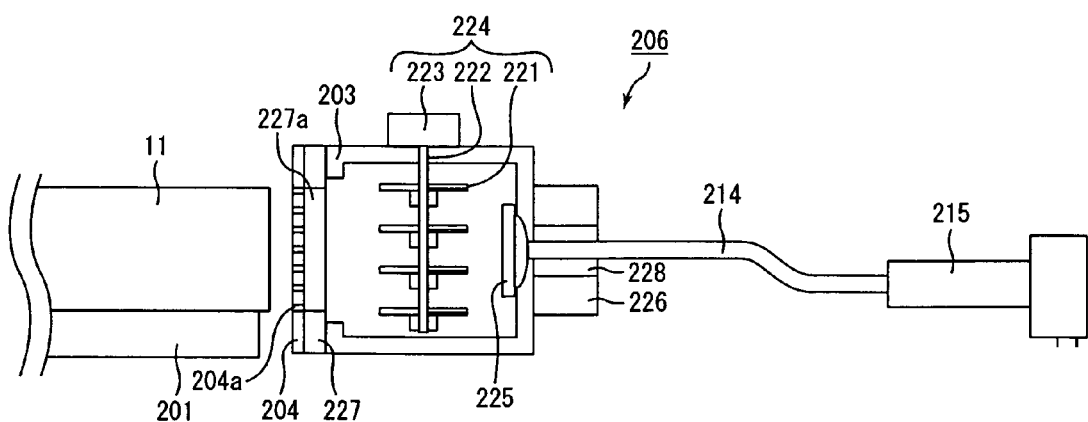
FIG. 5B is a partially enlarged cross-sectional view that schematically shows one portion of one embodiment of the paste filling device of FIG. 5A.

FIG. 4 is a conceptual view that schematically shows one example of the opening-sealing apparatus for a honeycomb molded body according to one embodiment of the present invention; FIG. 5A is a conceptual view that schematically shows one example of a paste filling device that constitutes the opening-sealing apparatus for a honeycomb molded body according to one embodiment of the present invention; and FIG. 5B is a partially enlarged cross-sectional view that schematically shows one example of the embodiments of the paste filling device of FIG. 5A.

The opening-sealing apparatus 200 for a honeycomb molded body comprises a rotary table 201 that rotates with a honeycomb molded body 11 mounted thereon, an image pickup device 205 that picks up an image of the end face of the honeycomb molded body 11, an opening-sealing mask 204, a paste discharging vessel 203 and the like, and is equipped with a paste filling unit 206 that fills the end portion of each of cells 12 in the honeycomb molded body 11 (see FIGS. 3-1A and 3-1B) with a plug material paste.

The rotary table 201 has its rotary axis set in a vertical direction and is designed to rotate horizontally, and eight molded body securing units 202 used for securing the honeycomb molded body 11 are attached thereto. The rotary table 201 is intermittently driven to rotate, and while each honeycomb molded body 11, secured to the molded body securing units 202, rotates virtually once, an opening-sealing process is carried out on the honeycomb molded body 11.

In this case, eight molded body securing units 202 are attached to the rotary table 201, however, the number of the molded body securing units 202 is not particularly limited, and may be six or another number.

As described above, the opening-sealing apparatus for a honeycomb structured body according to embodiments of the present invention is preferably equipped with a rotary table, and in the case where a rotary table is equipped, the opening-sealing apparatus for a honeycomb molded body may be downsized more easily.

Moreover, around the rotary table 201, image pickup devices 205 are placed at two locations and also two paste filling devices each having a paste filling unit 206 are installed, and with this arrangement, it is possible to fill in the end portion of the cell with a paste after each of the image pickup devices picks up the image of each different one of the end faces of a honeycomb molded body 11.

An opening-sealing process by using the opening-sealing apparatus 200 for a honeycomb molded body is carried out as follows: that is, firstly a honeycomb molded body 11, which is mounted on a belt conveyor 199 and transported, is secured by a robot arm (not shown in the Figure) to the molded body securing units 202 of the rotary table 201 that constitutes the opening-sealing apparatus 200 for a honeycomb molded body.

Next, when the rotary table 201 makes ⅛ rotation, the end face of the honeycomb molded body 11 is stopped at a position that faces the image pickup device 205 for picking up an image of the end face so that the image of the end face of the honeycomb molded body 11 is picked up by the image pickup device 205. The picked-up image is immediately image-analyzed by an image analyzing device (not shown in the Figure) connected to the image pickup device 205 so that the shape of the cell is extracted from the image, and the position of the cell to be opening-sealed is specified while the tilt and the like of the honeycomb molded body 11 are taken into consideration so that the position of the cell and the position of the opening of the opening-sealing mask 204 used for the opening-sealing process are compared so as to calculate the position at which the positional error between the opening of the opening-sealing mask 204 and the cell of the honeycomb molded body 11 is minimized. This calculating process will be described later in detail.

After the honeycomb molded body 11 has been image-picked up, it makes ⅛ rotation to the next position and stops. Then, the opening-sealing mask 204 is made in contact with the end face of the honeycomb molded body 11 at the calculated position where the positional error between the opening of the opening-sealing mask 204 and the cell 12 of the honeycomb molded body 11 is minimized, and next, a plug material paste fills in the cell through the opening of the opening-sealing mask 204 so that the sealing of the opening of the end face of the honeycomb molded body 11 is carried out. The paste filling units 206 are secured to a robot installed with angle adjusting members that are designed to set x-, y- and z-axes at designed positions.

Thereafter, when the rotary table 201 makes ⅛ rotation, the honeycomb molded body 11 secured to the molded body securing units 202 is raised by a robot arm (not shown in the Figure), and again secured to the molded body securing units 202 in such a manner that the opening-sealed end face is allowed to face the center of the rotary table 201 and the end face that has not been opening-sealed faces outside.

After that, when the rotary table 201 makes ⅛ rotation, the image of the end face of the honeycomb molded body 11 that has not been sealed is picked up by the image pickup device 205 in the same manner as the above-mentioned operations and, followed by next ⅛ rotation, the opening-sealing mask 204 is made in contact with the end face of the honeycomb molded body 11 at the position where the positional error between the opening of the opening-sealing mask 204 and the cell 12 of the honeycomb molded body 11 is minimized, and the opening-sealing process is carried out.

At a position of another ⅛ rotation, the honeycomb molded body 11 having been subjected to the opening-sealing process is raised by a robot arm not shown in the Figure, and mounted on a conveyor belt 207 for the next process.

Here, in the present specification, the above-mentioned robot arm refers to an arm that has active joints provided with motors and the like, and also has inactive joints without motors or the like, if necessary.

The following description will discuss the paste filling device including the paste filling unit 206 in detail. As shown in FIG. 5A, the paste filling device 220 is equipped with a paste filling unit 206 and a paste supplying unit 218 which supplies a plug material paste to the paste filling unit 206, and those two units are connected to each other through a plug material paste-supplying pipe 213. Here, the paste filling unit and the paste supplying unit may be directly connected to each other without the plug material paste-supplying pipe.

The paste supplying unit 218 is provided with a paste supplying hopper 211 and a paste discharging device 212, and in the paste supplying unit 218, a plug material paste, which is separately prepared and stored in the paste supplying hopper 211, is delivered from the paste supplying hopper 211 to the plug material paste-supplying pipe 213 by the paste discharging device 212, and further delivered to the paste filling unit 206.

Moreover, the plug material paste-supplying pipe 213 is interposed by a filter 216, and even when a lump substance is mingled in the plug material paste, it is possible for the lump substance to be removed by the filter 216.

Here, the filter may be interposed on demand, and is preferably interposed.

Although not particularly limited, the opening gauge of the filter is preferably set to at least about 0.1 mm and at most about 1.0 mm. The opening gauge of about 0.1 mm or more might be less likely to cause clogging by the plug material paste, and the opening gauge of about 1.0 mm or less may make it easier to certainly remove lump substances.

In the opening-sealing apparatus for a honeycomb molded body according to one embodiment of the present invention, as shown in FIG. 5A, the paste filling unit 206 and the paste supplying unit 218 are connected to each other through the plug material paste-supplying pipe 213, and the filter 216 is more preferably installed in the plug material paste-supplying pipe 213.

In the case where the filter is installed in the opening-sealing apparatus for a honeycomb molded body according to the above-mentioned embodiment, the filter may be placed inside the paste filling unit or inside the paste supplying unit, however, since the filter needs to be exchanged due to accumulation of the lump substances, and because of easiness for exchanging the filter, the filter is preferably interposed between the paste filling unit and the paste supplying unit, and is more preferably installed inside the plug material paste-supplying pipe that connects the paste filling unit and the paste supplying unit.

As shown in FIG. 5B, in addition to the opening-sealing mask 204 and the paste discharging vessel 203, the paste filling unit 206 is provided with a stirring unit 224 constituted by stirring blades 221, a stirring rod 222 and a motor 223; a flow regulating plate 225 placed on the inlet side (connecting portion to the plug material paste-supplying pipe 214) of the paste discharging vessel 203; an angle adjusting member 226 and a temperature controlling member 228 placed adjacent to the inlet side of the paste discharging vessel 203; a buffer member 227 made of silicon rubber which is interposed between the opening-sealing mask 204 and the paste discharging vessel 203; a mono-axial eccentric screw pump (mono pump) 215; and a plug material paste-supplying pipe 214 that connects the mono-axial eccentric screw pump 215 and the paste discharging vessel 203.

The plug material paste, delivered from the paste supplying unit 218, is first delivered to the mono-axial eccentric screw pump 215, and a predetermined amount thereof is then sent into the paste discharging vessel 203 by the mono-axial eccentric screw pump 215 through the plug material paste-supplying pipe 214 and the flow regulating plate 225, and further, through the opening-sealing mask 204, fills in a predetermined cell of the honeycomb molded body 11 that has been made in contact with the opening-sealing mask 204.

Moreover, in the stirring unit 224 installed inside the paste discharging vessel 203, the stirring rod 222 and the stirring blades 221 are allowed to rotate by the motor 223. Thus, by filling the cells with the plug material paste while the stirring blades 221 are rotating, the temperature of the plug material paste inside the paste discharging vessel 203 is uniformly maintained and thus the viscosity of the plug material paste is homogenized, and as a result, it becomes easier for the predetermined cells to be evenly filled with the plug material paste.

Here, the stirring rod and the stirring blades may be designed to move vertically.

Figure 6:
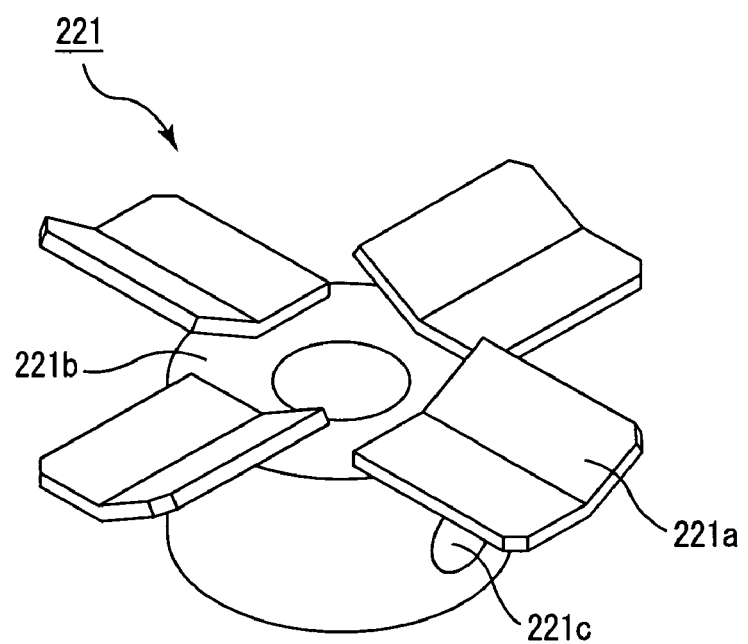
FIG. 6 is a perspective view that schematically shows one example of stirring blades that constitute the opening-sealing apparatus for a honeycomb molded body according to one embodiment of the present invention.

Moreover, as shown in FIG. 6, each stirring blade 221 comprises four blade main bodies 221a each having a bent plate-shaped body and a supporting member 221b having a hollow cylindrical shape, which is used for securing the blade main bodies 221a to the stirring rod 222. A screw hole 221c that penetrates to the hollow portion is formed on the side face of the supporting member 221b, and after the stirring rod 222 has been inserted into the hollow portion of the supporting member 221b, the stirring blade 221 is fixed to a predetermined position by a screw.

Here, FIG. 6 is a perspective view that schematically shows one example of a stirring blade that constitutes the opening-sealing apparatus for a honeycomb molded body according to one embodiment of the present invention.

Moreover, the stirring blade 221 shown in FIG. 6 has four blade main bodies; however, in the case where the opening-sealing apparatus for a honeycomb molded body of the present invention is provided with the stirring blades, the number of the blade main bodies are not particularly limited, and may be three or less, or five or more may be attached. Preferably, the number of the blades is set in a range from 3 to 5. Moreover, the shape of the blade main body is not limited to the bent plate-shaped member as shown in FIG. 6, and another shape may be used.

Moreover, in the paste filling unit 206, the angle adjusting member 226 and the temperature controlling member 228 are placed adjacent to the paste discharging vessel 203.

Upon making the paste discharging vessel 203 in contact with the end face of the honeycomb molded body 11, the angle adjusting member 226 is used so that the opening-sealing mask 204 is more easily adjusted to contact with the end face of the honeycomb molded body 11 at a predetermined position.

Here, the temperature controlling member 228 has a built-in heater, and the temperature of the plug material paste is more easily controlled to a predetermined temperature by the temperature controlling member 228.

The temperature controlling member may have a built-in cooling pipe of water-cooling or air-cooling type. Thus, the temperature of the plug material paste may become easier to be more positively controlled.

The shape formed by the inner walls of the paste discharging vessel 203 is not particularly limited, and may be a rectangular pillar shape or a prism shape, preferably, a cylindrical shape with the upper face and the bottom face being used as the inlet side and the outlet side, respectively.

This is because, in the case of the cylindrical shape, the effects of stirring the plug material paste by the stirring unit may be more easily enjoyed.

Examples of the material for the opening-sealing mask 204 include metal such as stainless steel and nickel; resin such as epoxy resin; and ceramic materials and the like.

In the opening-sealing mask 204, openings 204a, corresponding to cells which are to be filled with the plug material paste, are formed.

The area of the opening is preferably smaller than the opening of the corresponding cell. Even when the position of the opening of the opening-sealing mask is slightly misaligned with the position of the opening of the corresponding cell, this arrangement may make it easier to securely fill only the cell with the plug material paste and thus make it easier to prevent the plug material paste from adhering to the end face (cell end portion) of the honeycomb molded body. Here, since the plug material paste is flowable, even when the opening of the opening-sealing mask is smaller than the opening of the cell, the cell may certainly be filled with the plug material more easily.

The shape of the opening of the opening-sealing mask is not particularly limited, and may be any desired shape, such as a polygonal shape, a round shape and an oval shape, and preferably a round shape or a shape of a tetragon with R-chamfered corners or a shape of a tetragon with C-chamfered corners.

These arrangements make it possible to reduce the resistance upon filling the plug material paste.

Here, in the present specification, when the shape of the opening of the opening-sealing mask is referred to as having a shape of a tetragon with R-chamfered corners or a shape of a tetragon with C-chamfered corners, it does not mean that the opening of the mask is actually rounded or chamfered, but means that the formed opening has a shape that is the same as a shape formed by a tetragon having R-chamfered corners or C-chamfered corners.

Moreover, in the paste filling unit 206, the opening-sealing mask 204 is installed through a buffer member 227 made from silicon rubber.

Although, the buffer member is not necessarily installed, and may be installed on demand, it is preferable that the buffer member is installed, since, in the case where the buffer member is installed, the buffer member expands and contracts when the paste filling unit is made in contact with the honeycomb molded body, providing more secure adhesion between the opening-sealing mask and the end face of the honeycomb molded body, and as a result, influx of the plug material paste into the gap between the mask and the honeycomb molded body may be prevented more easily, and therefore the deviation of the amount of the plug material paste used for sealing may be reduced to a minimal level more easily.

The material for the buffer member is not limited to silicon rubber, and other materials, such as fluororubber, isobutylene-isoprene rubber, urethane rubber, butadiene rubber, isoprene rubber, styrene-butadiene rubber, chloroprene rubber, nitrile rubber and acrylic rubber may be used. Moreover, a sealing member comprising fluororesin, epoxy resin or the like may be used as the buffer member when openings are formed at predetermined positions.

Moreover, the buffer member 227 is provided with an opening 227a having such a shape as to include therein all the openings 204a formed in the opening-sealing mask 204, on the plan view. Therefore, in the opening-sealing apparatus for a honeycomb molded body, the plug material paste fills in the cells of the honeycomb molded body through the openings of the opening-sealing mask and the opening of the buffer member.

Here, with respect to the opening of the buffer member, openings, each having the virtually same shape as each of the openings formed in the opening-sealing mask, may be formed at such positions as to communicate with the openings of the opening-sealing mask.

Moreover, in the paste filling unit 206, the flow regulating plate 225 is placed on the inlet side (the side opposite to the side on which the opening-sealing mask is placed) of the paste discharging vessel 203.

By placing the flow regulating plate 225, the flow-in speed of the plug material paste at the inlet of the paste discharging vessel 203 may be more easily equalized between the center and the outer edge of the inlet, and as a result, when the plug material paste fills in the cells, the amount of filling to each cell may become easier to be made even. Here, in the case where the flow regulating plate is not placed, at the inlet of the paste discharging vessel 203, the flow-in speed of the paste at the center of the inlet tends to become faster than the flow-in speed at the outer edge of the inlet, with the result that the amount of filling of the plug material paste to each cell tends to become different.

Figure 7A:
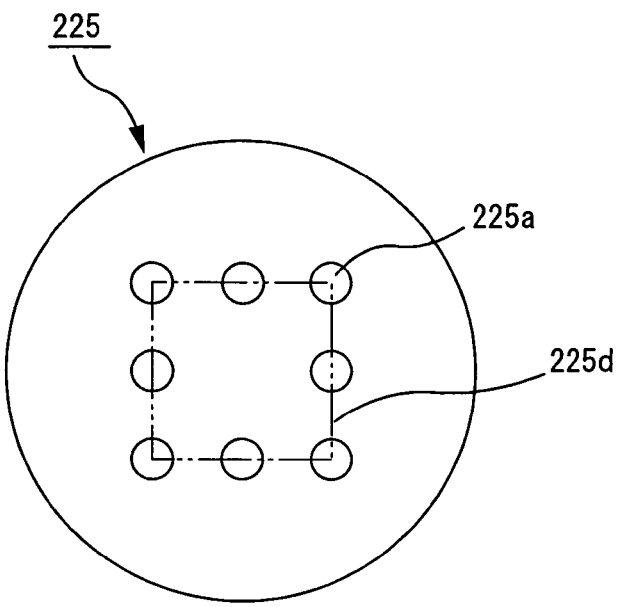
FIGS. 7A and 7B are plan views each of which schematically shows one example of a flow regulating plate that constitutes the opening-sealing apparatus for a honeycomb molded body according to one embodiment of the present invention.
Figure 7B:
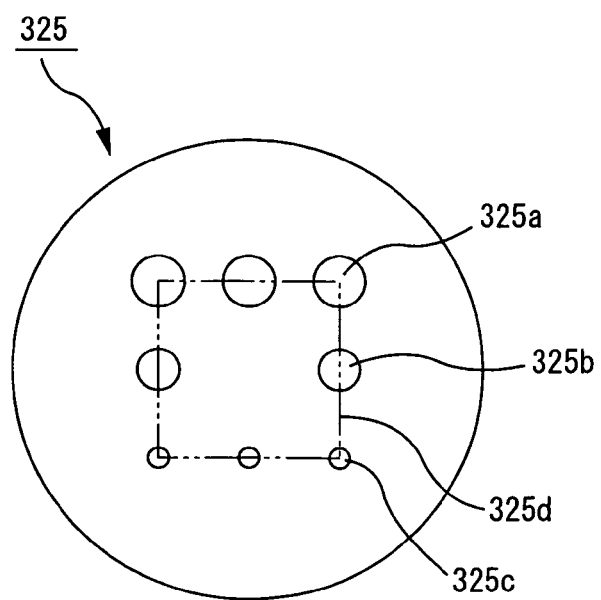

FIGS. 7A and 7B are schematic plan views that respectively show examples of the flow regulating plates each of which forms one component of the opening-sealing apparatus for a honeycomb molded body according to the embodiments of the present invention.

As shown in FIG. 7A, the flow regulating plate 225 having a disc shape is provided with openings formed at predetermined positions. More specifically, a hypothetical square 225d is drawn on the disc-shaped flow regulating plate main body in such a manner that the center thereof superposes on the center of the flow regulating plate main body, and openings 225a having the same diameter are formed on the respective vertexes of the hypothetical square 225d and on the respective middle points of each side.

Here, the hypothetical square 225d is not actually drawn.

By placing the flow regulating plate without an opening in the center like this type, it may become easier to prevent the flowing rate in the center of the inlet from becoming too high, when the plug material paste flows into the paste discharging vessel 203.

Moreover, the shape of the flow regulating plate is not limited to the shape shown in FIG. 7A and, as shown in FIG. 7B, a shape in which three kinds of openings having different diameters are formed at predetermined positions may be used. More specifically, with respect to a flow regulating plate 325, a hypothetical square 325d is drawn on the disc-shaped flow regulating plate main body in such a manner that the center thereof superposes on the center of the flow regulating plate main body, and three large openings 325a are formed with equal intervals on the side located on the top of the hypothetical square 325d, while three small openings 325c are formed with equal intervals on the side located on the bottom, and medium openings 325b are formed on the respective middle points of two sides located on the side. Here, the hypothetical square 325d is not actually drawn.

In the case of this flow regulating plate 325, in comparison with the flow regulating plate 225 shown in FIG. 7A, the diameters of the openings are made smaller toward the lower side, while the formation positions of the openings are the same. When the plug material paste is allowed to flow into the paste discharging vessel 203, the flowing rate becomes higher in the center portion of the inlet as described above, and in addition to this, the flowing rate on the lower side tends to become faster than that on the upper side due to the influence of gravity; therefore, by making the diameters of the openings smaller toward the lower side of the flow regulating plate with respect to the formation positions, the flowing rates of the plug material paste may be equalized more easily.

The shape of the flow regulating plate is not particularly limited, and any shape may be used as long as it can equalize the flow rate of the plug material paste, and normally, a shape in which no opening is formed in the center or a shape in which the opening formed in the center has a small diameter (more specifically, an opening smaller than the cell) is preferably used. Moreover, a shape in which openings formed at relatively lower positions have smaller diameters than those of openings formed at relatively higher positions is preferably used.

Here, the absolute value of the opening diameter and the number of the openings are not particularly limited.

Referring to a flowchart, the following description will discuss a method of analyzing an image obtained by the image pickup device by an image analyzing device, and a method of filling the plug material paste using the results of the image analysis.

Figure 8:
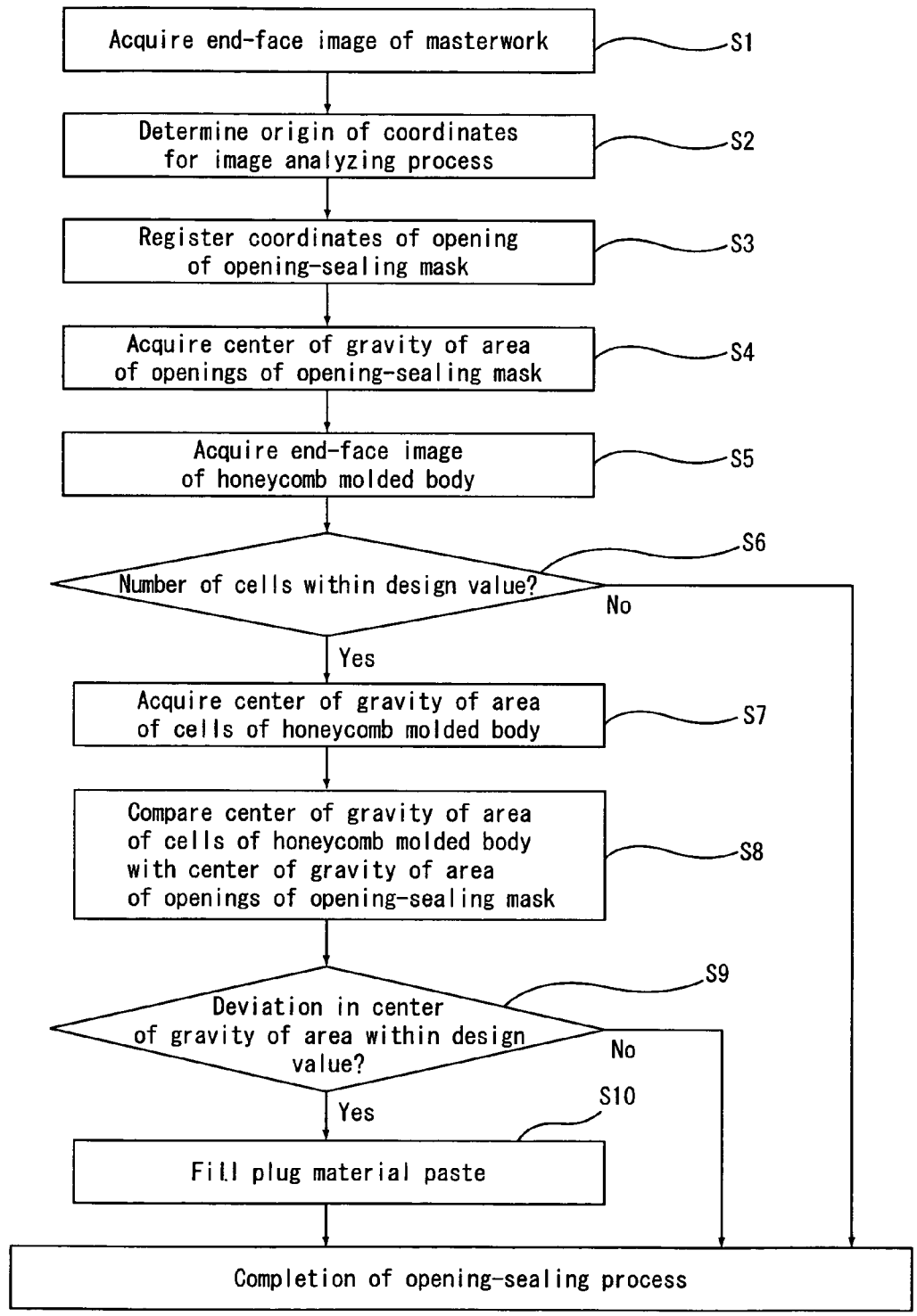
FIG. 8 is a flowchart that shows one example of processes (means) from an analysis of the end-face image of a honeycomb molded body to the filling of a plug material paste.

FIG. 8 is a flowchart that shows one example of the processes (means) from the analysis of an end-face image of a honeycomb molded body to the filling of plug material paste.

(a) First, as a standard sample, a masterwork, which has the same external shape as the honeycomb molded body (that is, a rectangular parallelepiped shape) except that no cells are formed, with a plurality of bottomed holes formed on an end face, is secured to the molded body securing unit 202 of the opening-sealing apparatus for a honeycomb molded body 200, and the end face of the masterwork with the bottomed holes formed thereon is image-picked up (process S1), and then the coordinates of the formation positions of the bottomed holes are registered in the image analyzing device to determine the origin of coordinates (process S2).

(b) Next, based upon the origin of coordinates determined in the above-mentioned process (a), the positions of openings formed in the opening-sealing mask are registered in the image analyzing device (process S3).

Moreover, based upon the positions of the openings registered in the process S3 and the sizes thereof, the center of gravity of the area of the openings formed in the opening-sealing mask is acquired (process S4).

In the image analyzing device, prior to filling the cells of a honeycomb molded body with the plug material paste, the above-mentioned processes (a) and (b) are carried out.

(c) Next, the end face of a honeycomb molded body that is secured to the molded body securing units 202 of the opening-sealing apparatus 200 for a honeycomb molded body and transported in accordance with the rotation of the rotary table 201 is image-picked up and the resulting image is registered in the image analyzing device (step S5).

Further, in the image analyzing device, the end-face image thus picked up is analyzed, and the number of cells that are different from designed shapes is calculated; thus, in the case where the number thereof is greater than a predetermined number, the corresponding honeycomb molded body is determined as a defective product, while the other honeycomb molded bodies are determined as good products, so that good products and defective products are distinguished (process S6).

Here, the honeycomb molded body determined as a good product is subjected to the next process S7, while the honeycomb molded body determined as a defective product is not subjected to the succeeding filling of the plug material paste, thereby finishing an opening-sealing process.

(d) Next, the end-face image of the honeycomb molded body that is determined as a good product, is first subjected to a binarizing process, and based upon the image obtained through the binarizing process, the center of gravity of the area of the respective cells is acquired (process S7).

Here, in order to make the outline of each cell clearer, various filtering treatments may be conducted on the end-face image, if necessary, before and after the binarizing process.

(e) Next, the amount of deviation between the center of gravity of the area of the openings of the opening-sealing mask acquired in the process S4 and the center of gravity of the area of the respective cells acquired in the process S7 is calculated by using the least squares method (process S8).

With respect to the openings and the cells to be calculated to obtain the amount of deviation between the center of gravity of the area of the openings of the opening-sealing mask and the center of gravity of the area of the respective cells of the honeycomb molded body, all the openings and the cells may be used, or one portion of the openings and the cells, more specifically, for example, openings and cells except for those on the peripheral two rows, and the like may be used.

In the case where there is any cell having the amount of deviation beyond a predetermined value, the corresponding honeycomb molded body is determined as a defective product, while the other honeycomb molded bodies are determined as good products, so that good products and defective products are distinguished (process S9).

Here, the honeycomb molded body determined as a good product is subjected to the next process S10, while the honeycomb molded body determined as a defective product is not subjected to the succeeding filling of the plug material paste, thereby finishing the opening-sealing process.

With respect to the cause of deviation in the positions of cells of the honeycomb molded body, for example, the occurrence of distortion in the honeycomb molded body, the adherence of dusts to the cells, and the like are listed.

(f) Next, based upon the amount of deviation between the centers of gravity of areas calculated in the above-mentioned process (e), the opening-sealing mask (paste discharging vessel 203) is shifted, with the position of the opening-sealing mask being adjusted, so that the opening-sealing mask is made in contact with the end face of the honeycomb molded body; thus, the cells of the honeycomb molded body is filled with the plug material paste discharged from the paste discharging vessel 203 (process S10) so that an opening-sealing process onto one of the end faces of the honeycomb molded body is completed.

Here, the positioning process of the opening-sealing mask can be carried out by the angle adjusting member 226.

Moreover, in this embodiment, the positioning process between the opening-sealing mask and the cells is carried out based upon the amount of deviation between the centers of gravity of the areas calculated in the process S8, however, for example, in the case where only the amount of deviation between the openings and the cells except for those located on the peripheral two rows is calculated in the above-mentioned process S8, after the positioning process based upon the amount of deviation between the centers of gravity of the areas has been carried out, a further positioning process may be carried out on those on the peripheral two rows manually in a separate manner.

Here, since the above-mentioned operations (a) to (f) are carried out on one of the end faces of a honeycomb molded body, in order to fill in both the two end faces of the honeycomb molded body with a plug material paste, the above-mentioned operations (a) to (f) are carried out over again.

As described above, in the opening-sealing apparatus for a honeycomb molded body according to embodiments of the present invention, the position of the opening-sealing mask 204 is determined by using image analyzing device by the above-mentioned method, and thus it becomes easier to reduce the positional deviation between the cells and the openings of the opening-sealing mask 204 to a minimal level, and consequently all the necessary cells tend to be desirably filled with the plug material paste; and thus, it becomes easier to manufacture a honeycomb molded body 11 with no defective filling.

Moreover, in the opening-sealing apparatus 200 for a honeycomb molded body, the cells are filled with the plug material paste on the assumption that the honeycomb molded body is secured to a predetermined position of the molded body securing unit 202 attached to the rotary table; however, the secured position may deviate, and in the case where any deviation occurs in the secured position, there is a possibility that the honeycomb molded body, even if it has a predetermined shape, may be determined as a defective product in the process S6 and the process S8. Therefore, it is preferable to inspect whether or not the honeycomb molded body is secured to the predetermined position of the molded body securing units 202, after the analysis of the end-face image of the honeycomb molded body and prior to filling the cells with the plug material paste.

Moreover, at this stage, inspection may be carried out each time the honeycomb molded body is secured, while it is preferable to inspect one out of a plurality of honeycomb molded bodies, for example, one out of every eight honeycomb molded bodies, when eight molded body securing units are attached to the rotary table.

Additionally, in the above-mentioned embodiment, the positioning process between the cells formed on the end face of the honeycomb molded body 11 and the opening-sealing mask is carried out by shifting the opening-sealing mask 204; however, the positioning process between the cells and the opening-sealing mask 204 may be carried out by shifting the honeycomb molded body 11.

In accordance with the opening-sealing apparatus for a honeycomb molded body according to embodiments of the present invention, since the position of the opening-sealing mask is determined by using the image analyzing device and the like, positional deviations between the cells of a honeycomb molded body and the openings of an opening-sealing mask may be reduced to a minimal level more easily, and all the necessary cells tend to be excellently filled with the plug material paste.

Moreover, in one embodiment of the above-mentioned opening-sealing apparatus for a honeycomb molded body, the shape of cells in a honeycomb molded body to be filled with the plug material paste tends not to be limited.

Next, the opening-sealing apparatus for a honeycomb fired body according to the embodiments of the present invention will be described.

In the opening-sealing apparatus for a honeycomb fired body according to the embodiments of the present invention, the honeycomb fired body that is the object to be filled in with the plug material paste is a honeycomb fired body which is prepared by firing the honeycomb molded body described above, and the shape thereof is almost the same as that of the honeycomb molded body. Therefore, the apparatus used as the opening-sealing apparatus for a honeycomb fired body according to the embodiments of the present invention can be the same as that of the opening-sealing apparatus for a honeycomb molded body according to the embodiments of the present invention.

In accordance with the opening-sealing apparatus for a honeycomb fired body according to embodiments of the present invention, since the position of the opening-sealing mask is determined by using the image analyzing device and the like, positional deviations between the cells of a honeycomb fired body and the openings of an opening-sealing mask may be reduced to a minimal level more easily, and all the necessary cells tend to be excellently filled with the plug material paste.

Moreover, in one embodiment of the above-mentioned opening-sealing apparatus for a honeycomb fired body, the shape of cells in a honeycomb fired body to be filled with the plug material paste tends not to be limited.

The following description will discuss the method of filling a plug material paste according to embodiments of the present invention.

In the method of filling a plug material paste according to the embodiments of the present invention, the plug material paste may be filled into the cells of the honeycomb molded body as well as into the cells of the honeycomb fired body.

First, the method for filling a plug material paste according to the embodiments of the present invention in which the plug material paste is filled into the cells of the honeycomb molded body will be described.

As described above, the method of filling a plug material paste according to embodiments of the present invention is desirably carried out by using the opening-sealing apparatus for a honeycomb structured body according to embodiments of the present invention as an opening-sealing apparatus.

In other words, a plug material paste, preliminarily manufactured in a separate manner, is loaded into the paste supplying hopper 211 of the paste supplying unit 218, and sent to the paste filling unit 206 from the paste supplying unit 218 so that the predetermined cells 12 of a honeycomb molded body 11 is filled with the plug material paste through the paste filling unit 206 (see FIGS. 4, 5A and 5B).

Examples of the plug material paste include a paste which has the same composition as a wet mixture prepared by mixing a powder material containing at least one kind of powder and a liquid material containing at least a dispersant solution, obtained in the method of manufacturing a honeycomb structured body according to one embodiment of the present invention as will be described later.

The temperature of the plug material paste is preferably set to at least about 30° C. and at most about 110° C. The temperature of about 30° C. or more tends not to provide a plug material paste with a high viscosity so that the cells can be certainly filled with the plug material paste more easily, while the temperature of about 110° C. or less tends not to provide a plug material paste with a low viscosity, and as a result, the shape retaining property of the filled plug material paste tends not to be deteriorated.

The viscosity of the plug material paste is preferably set to at least about 35 Pa·s and at most about 50 Pa·s (measurement temperature: 25° C.). If the viscosity is about 35 Pa·s or more, the flowability of the plug material paste tends not to become high, making it less likely for the plug material paste to flow inside the cells when the cells of the honeycomb molded body is filled with the paste, and thus the opening-sealing may be more easily carried out sufficiently, while in contrast, if the viscosity is about 50 Pa·s or less, the plug material paste tends not to clog the opening-sealing mask and filter, and also tends to be more easily filled inside the cells of the honeycomb molded body.

Moreover, in the method of filling a plug material paste according to embodiments of the present invention, the opening area of the opening-sealing mask constituting the opening-sealing apparatus is preferably smaller than the opening area of the cell of the honeycomb molded body, and it is more preferable that the opening area of the opening-sealing mask is set to at least about 5% and at most about 35% of the opening area of the cells.

In the case of about 5% or more, it may become easier to fill the cells with the plug material paste, while in the case of about 35% or less, the plug material paste may be less likely to adhere to the end face (end portion of the cell wall) of the honeycomb molded body. Moreover, in the case of about 35% or less, it becomes less likely that positional adjustment of the mask and the cells tends to be difficult, with the result that the case where the openings of the mask do not face with the openings of the cells at the peripheral portion of the honeycomb molded body tends not to occur.

Moreover, in the method of filling a plug material paste according to embodiments of the present invention, when the opening-sealing apparatus is equipped with a stirring unit, the stirring unit preferably carries out the stirring process at the rotating speed of at least about 160 rpm and at most about 300 rpm.

The rotating speed of about 160 rpm or more tends not to make the temperature of the plug material paste irregular, causing less irregularity in the viscosity of the plug material, with the result that deviations tend not to occur in the filling amount in each cell, while in contrast, the rotating speed of about less than 300 rpm tends not to cause reduction in the viscosity of the plug material paste, and as a result, the shape retaining property of the plug material paste filled in the cells may be less likely to be deteriorated.

In the method of filling a plug material paste according to embodiments of the present invention, since the position of the opening-sealing mask is determined by using the image analyzing device and the like installed in the opening-sealing apparatus, positional deviations between the cells of a honeycomb molded body and the openings of an opening-sealing mask may be reduced to a minimal level more easily, and the plug material paste tends to excellently fill in all the necessary cells, causing less defective filling, and thus it may become easier to fill the predetermined cells of a honeycomb molded body with a plug material paste.

Next, the method for filling a plug material paste according to the embodiments of the present invention in which the plug material paste is filled into the cells of the honeycomb fired body will be described.

In this filling method, as in the case where the plug material paste is filled into the cells of the honeycomb molded body by using the method for filling a plug material paste according to the embodiments of the present invention as described above, it becomes possible for the plug material paste to be filled into the cells of the honeycomb fired body by using the opening-sealing apparatus according to the embodiments of the present invention.

In this case also, since the position of the opening-sealing mask is determined by using the image analyzing device and the like installed in the opening-sealing apparatus, positional deviations between the cells of a honeycomb fired body and the openings of an opening-sealing mask may be reduced to a minimal level more easily, and the plug material paste tends to excellently fill in all the necessary cells, causing less defective filling, and thus it may become easier to fill the predetermined cells of a honeycomb fired body with a plug material paste.

The following description will discuss a manufacturing method of the honeycomb structured body according to one embodiment of the present invention.

The manufacturing method of a honeycomb structured body according to one embodiment of the present invention comprises: molding a ceramic material to manufacture a pillar-shaped honeycomb molded body in which a number of cells are placed in parallel in a longitudinal direction with a cell wall therebetween; injecting a plug material paste to fill in either of the end portions of the cells by an opening-sealing apparatus; and firing the honeycomb molded body to manufacture a honeycomb structured body having the resulting honeycomb fired body, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb molded body; and an image analyzing device for analyzing the image obtained by the image pickup device, the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

A method of manufacturing a honeycomb structured body according to the embodiments of the present invention comprises:

molding a ceramic material to manufacture a pillar-shaped honeycomb molded body in which a number of cells are placed in parallel in a longitudinal direction with a cell wall therebetween;

firing the honeycomb molded body to manufacture a honeycomb fired body;

injecting a plug material paste to fill in either of the end portions of the cells by an opening-sealing apparatus; and further firing or drying the honeycomb fired body to manufacture a honeycomb structured body comprising the resulting honeycomb fired body, wherein the opening-sealing apparatus comprises a paste filling device equipped with a paste filling unit having an opening-sealing mask in which a number of openings are formed at predetermined positions and a paste supplying unit which supplies a plug material paste to the paste filling unit; an image pickup device for picking up an image of the end face of the honeycomb molded body; and an image analyzing device for analyzing the image obtained by the image pickup device, the image analyzing device analyzes the positions of the cells based upon the image of the end face picked up by the image pickup device, the opening-sealing mask is made in contact with the end face of the honeycomb molded body in such a manner that the positional error between the openings of the opening-sealing mask and the cells of the honeycomb molded body is reduced to a minimal level, and the plug material paste, which has been supplied from the paste supplying unit to the paste filling unit, is injected through the opening-sealing mask to fill in the end portion of the cells.

In the method of manufacturing a honeycomb structured body according to the embodiments of the present invention, the plug material paste may be filled into the cells of the honeycomb molded body, or into the cells of the honeycomb fired body.

First, the method of manufacturing a honeycomb structured body according to the embodiments of the present invention in which the plug material paste is filled into the cells of the honeycomb molded body will be described in the order of processes.

In this case, the manufacturing method of the present invention is explained by taking, as an example, a case where silicon carbide is used as a main component of the constituent materials.

It goes without saying that the main component of the constituent materials of the honeycomb structured body is not limited to silicon carbide, and, for example, the aforementioned other ceramic materials, such as a silicon-containing ceramic material and a ceramic material combined with silicon or a silicate compound, may also be used.

First, a powder material containing at least one kind of powder and a liquid material containing at least a dispersant solution are mixed in a wet-mixer to prepare a wet mixture.

With respect to the powder corresponding to at least one kind contained in the powder material, silicon carbide powder as mentioned above can be preferably used.

Although the particle size of the silicon carbide powder is not particularly limited, for example, such powder as prepared by combining 100 parts by weight of powder having an average particle diameter of at least about 0.3 μm and at most about 50 μm with at least about 5 parts by weight and at most about 65 parts by weight of powder having an average particle diameter of at least about 0.1 μm and at most about 1.0 μm, is preferably used. When the average particle diameter is set in the above-mentioned range, the powder is less likely to cause shrinkage in the succeeding firing process, and thus preferably used.

In order to adjust the pore diameter or the like of the honeycomb fired body, it is necessary to adjust the firing temperature, and also it may become easier to adjust the pore diameter by adjusting the particle diameter of silicon carbide powder.

With respect to the above-mentioned ceramic powder, silicon carbide powders having different average particle diameters as described above are preferably used.

Examples of the organic binder include: methyl cellulose, carboxymethyl cellulose, hydroxyethyl cellulose, polyethylene glycol, and the like, although not particularly limited thereto. Among these, methyl cellulose is preferably used.

Moreover, balloons that are fine hollow spheres comprising oxide-based ceramics and a pore forming agent such as spherical acrylic particles and graphite may be added to the above-mentioned powder material, if necessary.

Examples of the balloons include: alumina balloons, glass micro-balloons, shirasu balloons, fly ash balloons (FA balloons), mullite balloons and the like, although not particularly limited thereto. Among these, alumina balloons are preferably used.

In the case where two kinds or more of materials are contained in the powder material, these materials may be preliminarily dry-mixed by using a stirring device or the like prior to charging into the wet-type mixer.

Examples of the dispersant solution that is at least contained in the liquid material include: water, an organic solvent such as benzene, and an alcohol such as methanol, although not particularly limited thereto.

In addition to the dispersant solution, a liquid-state plasticizer, a lubricant and the like may be further contained in the liquid material.

Examples of the plasticizer include glycerin and the like, although not particularly limited thereto.

Moreover, examples of the lubricant include: polyoxyalkylene-based compounds, such as polyoxyethylene alkyl ether and polyoxypropylene alkyl ether and the like, although not particularly limited thereto.

Specific examples of the lubricant include polyoxyethylene mono-butyl ether, polyoxypropylene mono-butyl ether and the like.

Furthermore, a molding auxiliary may be added to the liquid material.

Examples of the molding auxiliary include: ethylene glycol, dextrin, fatty acid, fatty acid soap, polyalcohol and the like, although not particularly limited thereto.

The liquid material containing such a plurality of materials may be preliminarily mixed prior to charging into the wet-type mixer in the same manner as the powder material.

Next, the resulting wet mixture is loaded into an extrusion molding machine, and extrusion-molded to provide a honeycomb molded body having a predetermined shape. Here, the opening diameter of cells of the honeycomb molded body manufactured through the present processes may be the same in all the cells, or may be different.

In order to manufacture such a honeycomb molded body as to have different opening diameters between gas flow-in cells and gas flow-out cells, a metal mold to be used for the extrusion molding process is designed and manufactured so as to obtain a desired shape by generally used techniques.

Next, the honeycomb molded body is dried, if necessary, by using a dryer, such as a microwave dryer, a hot-air dryer, a dielectric dryer, a reduced-pressure dryer, a vacuum dryer and a freeze dryer.

Next, each of the end portions of predetermined cells of the honeycomb molded body is filled with a predetermined amount of plug material paste, which forms plugs, so as to seal the cells.

In the manufacturing method of a honeycomb structured body according to embodiments of the present invention, predetermined cells are sealed through this process by using the opening-sealing apparatus for a honeycomb molded body according to embodiments of the present invention and the method of filling the plug material paste according to embodiments of the present invention.

Here, since the plug material paste with which cells are filled has been explained, the explanation thereof is omitted.

The plug material paste with which cells are filled in this process is preferably such that can be made into the plug having a porosity of at least about 30% and at most about 75% after the post processes.

Next, the ceramic dried body which is filled with the plug material paste is subjected to degreasing (for example, at a temperature of at least about 200° C. and at most about 500° C.) and firing (for example, at a temperature of at least about 1400° C. and at most about 2300° C.) processes under predetermined conditions so that a honeycomb fired body formed by a single fired body in its entire body, in which a plurality of cells are placed in parallel with one another in the longitudinal direction with a cell wall therebetween, with either one of the end portions of each cell being sealed, is manufactured.

With respect to the conditions for degreasing and firing the ceramic dried body, conventional conditions used for manufacturing a filter comprising a porous ceramic material can be applied.

Next, a sealing material paste, which forms a sealing material layer (adhesive layer), is applied onto a side face of the honeycomb fired body with even thickness to form a sealing material paste layer, and on this sealing material paste layer, another honeycomb fired body is laminated; repeating these processes successively, thereby an aggregated body of the honeycomb fired bodies having a predetermined size is manufactured.

With respect to the sealing material paste, for example, those comprising inorganic fibers and/or inorganic particles in addition to an inorganic binder and an organic binder may be used.

Examples of the inorganic binder include silica sol, alumina sol and the like. Each of these may be used alone, or two kinds or more of these may be used in combination. Among the inorganic binders, silica sol is preferably used.

Examples of the organic binder include: polyvinyl alcohol, methyl cellulose, ethyl cellulose, carboxymethyl cellulose and the like. Each of these may be used alone or two or more kinds of these may be used in combination. Among the above-mentioned organic binders, carboxymethyl cellulose is more desirably used.

Examples of the inorganic fibers include: ceramic fibers such as silica-alumina, mullite, alumina and silica, and the like. Each of these may be used alone, or two or more kinds of these may be used in combination. Among the above-mentioned inorganic fibers, alumina fibers are more desirably used.

Examples of the inorganic particles include: carbides, nitrides and the like, more specifically, inorganic fine powder comprising silicon carbide, silicon nitride or boron nitride, and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres comprising oxide-based ceramics and a pore forming agent such as spherical acrylic particles or graphite may be added to the above-mentioned sealing paste, if necessary.

Examples of the above-mentioned balloons include: alumina balloons, glass micro-balloons, shirasu balloons, fly ash balloons (FA balloons), mullite balloons and the like, although not particularly limited thereto. Among these, alumina balloons are more desirably used.

Next, this aggregated body of the honeycomb fired bodies is heated so that the sealing material paste layers are dried and solidified to form sealing material layers (adhesive layers).

Moreover, the aggregated body of the honeycomb fired bodies in which a plurality of the honeycomb fired bodies are bonded to one another through sealing material layers (adhesive layers) is subjected to a cutting process by using a diamond cutter and the like so that a cylindrical-shaped ceramic block is manufactured.

Then, a sealing material layer (coat layer) is formed on the outer circumference of the honeycomb block using the sealing material paste so that a honeycomb structured body, in which a plurality of honeycomb fired bodies are bonded to one another through sealing material layers (adhesive layers) with a sealing material layer (coat layer) being formed on the outer peripheral of the cylindrical-shaped ceramic block, can be manufactured.

Thereafter, a catalyst is supported on the honeycomb structured body, if necessary. The catalyst-supporting process may be carried out on the honeycomb fired bodies prior to being manufactured into the aggregated body.

Upon supporting the catalyst thereon, preferably, an alumina film having a high specific surface area is formed on the surface of the honeycomb structured body, and a co-catalyst and a catalyst such as platinum are applied to the surface of this alumina film.

Examples of the method for forming the alumina film on the surface of the honeycomb structured body include a method in which the honeycomb structured body is impregnated with a solution of a metal compound containing aluminum such as $Al(NO_3)_3$ and then heated, and a method in which the honeycomb structured body is impregnated with a solution containing alumina powder and then heated, and the like.

With respect to the method for applying a co-catalyst to the alumina film, for example, a method in which the honeycomb structured body is impregnated with a solution of a metal compound containing a rare-earth element, such as $Ce(NO_3)_3$, and then heated is proposed.

Examples of the method for applying a catalyst to the alumina film include: a method in which the ceramic fired body is impregnated with a nitric acid solution of diammine dinitro platinum ($[Pt(NH_3)_2(NO_2)_2]HNO_3$: about 4.53% by weight in platinum concentration) or the like and then heated, and the like.

Moreover, the catalyst may be applied in such a manner that a catalyst is preliminarily applied to alumina particles and the honeycomb structured body is impregnated with a solution containing the alumina powder to which the catalyst has been applied, and then heated.

The manufacturing method of the honeycomb structured body described above relates to a honeycomb structured body (hereinafter, referred to as aggregated-type honeycomb structured body) in which a plurality of honeycomb fired bodies are bonded to one another through sealing material layers (adhesive layers); however, the honeycomb structured body to be formed by the manufacturing method of the present invention may be a honeycomb structured body in which a cylindrical-shaped ceramic block is formed by a single honeycomb fired body (hereinafter, referred to as integral-type honeycomb structured body).

For manufacturing the integral-type honeycomb structured body of this type, first, a honeycomb molded body is manufactured by using the same method as that used for manufacturing the aggregated-type honeycomb structured body, except that the size of the honeycomb molded body to be formed through extrusion-molding is larger in comparison with that of the aggregated-type honeycomb structured body.

Here, the method and the like used for mixing the powder material and the liquid material to prepare the wet mixture are the same as those used for manufacturing the aggregated-type honeycomb structured body, and therefore the description thereof is omitted.

Next, in the same manner as the manufacturing method for the aggregated-type honeycomb structured body, the above-mentioned honeycomb molded body is dried by using a drier such as a microwave drier, a hot-air drier, a dielectric drier, a reduced-pressure drier, a vacuum drier and a freeze drier. Thereafter, the end portion on the outlet side of the inlet-side group of cells and the end portion on the inlet side of the outlet-side group of cells are filled with a predetermined amount of plug material paste, which forms plugs, so that the cells are sealed.

Here, the method of filling the plug material paste is the same as that used for manufacturing the aggregated-type honeycomb structured body, and therefore the description thereof is omitted.

Thereafter, in the same manner as the manufacturing method of the aggregated-type honeycomb structured body, by carrying out degreasing and firing to manufacture a ceramic block, and then by forming a sealing material layer (coat layer) on the ceramic block, if necessary, an integral-type honeycomb structured body can be manufactured. Moreover, a catalyst may be supported on the integral-type honeycomb structured body by using the above-mentioned method. With respect to the main constituent material for the integral-type honeycomb structured body, cordierite and aluminum titanate are preferably used.

With this arrangement, the manufacturing method of the honeycomb structured body according to embodiments of the present invention makes it easier to efficiently manufacture a honeycomb structured body in which predetermined cells are certainly sealed.

In the method of manufacturing a honeycomb structured body according to embodiments of the present invention, since the position of the opening-sealing mask is determined by using the image analyzing device and the like installed in the opening-sealing apparatus upon filling the predetermined cells of a honeycomb molded body with a plug material paste, positional deviations between the cells of a honeycomb molded body and the openings of an opening-sealing mask tends to be reduced to a minimal level, and the plug material paste tends to fill in all the necessary cells, causing less defective filling, and thus it may become easier to manufacture a honeycomb structured body in which the predetermined cells are filled with a plug material paste without any defective filling.

Next, the method of manufacturing a honeycomb structured body according to the embodiments of the present invention in which the plug material paste is filled into the cells of the honeycomb fired body will be described.

In this manufacturing method, as in the method for manufacturing a honeycomb structured body according to the embodiments of the present invention in which the sealing material paste is filled into the cells of the honeycomb molded body, the opening-sealing apparatus according to the embodiments of the present invention is used, and the plug material paste may be easily filled into the cells of the honeycomb fired body by using the method of filling a plug material paste according to the embodiments of the present invention.

In this case also, since the position of the opening-sealing mask is determined by using the image analyzing device and the like installed in the opening-sealing apparatus, positional deviations between the cells of a honeycomb fired body and the openings of an opening-sealing mask may be reduced to a minimal level more easily, and the plug material paste tends to excellently fill in all the necessary cells, causing less defective filling, and thus it may become easier to manufacture a honeycomb structured body in which the predetermined cells of a honeycomb fired body is filled with a plug material paste.

In the above-mentioned opening-sealing apparatus for a honeycomb molded body, opening-sealing apparatus for a honeycomb fired body, method of filling a plug material paste and method of manufacturing a honeycomb structured body in accordance with the present invention, the opening-sealing apparatus equipped with a rotary table is exemplified as an opening sealing apparatus; however, the opening-sealing apparatus is not necessarily equipped with the rotary table, and may be equipped with a device having a function similar to the rotary table (that is, the function to transport the honeycomb molded body or the honeycomb fired body successively to a predetermined position) in place of the rotary table.

Specifically, for example, the opening-sealing apparatus may be equipped with: a conveyer such as a pallet conveyer and a belt conveyer so that the honeycomb molded body or the honeycomb fired body is successively transported by the conveyer; a rail and a movable table which moves along the rail so that the honeycomb molded body or the honeycomb fired body is loaded on the movable table to be transported successively; or a plurality of fixed tables built at predetermined positions and robot arms so that the honeycomb molded bodies or honeycomb fired bodies loaded on the fixed tables are shifted by the robot arms. Here, a device having the same function as the rotary table is not limited to those exemplified herein.

EXAMPLES

The following description will discuss the present invention in detail by means of Examples and Reference examples; however, the present invention is not intended to be limited by those examples and the like.

Examples 1 to 8, Reference Examples 1 to 11

(1) Powder of α-type silicon carbide having an average particle diameter of 10 μm (250 kg), powder of α-type silicon carbide having an average particle diameter of 0.5 μm (100 kg) and an organic binder (methyl cellulose) (20 kg) were mixed to prepare mixed powder.

Separately, a lubricant (UNILUBE made by NOF corp.) (12 kg), a plasticizer (glycerin) (5 kg) and water (65 kg) were mixed to prepare a liquid mixture, and this liquid mixture and the mixed powder were mixed by using a wet-type mixer to prepare a wet mixture.

Next, this wet mixture was extrusion-molded and successively subjected to cutting processes so that a honeycomb molded body was manufactured. Thereafter, the honeycomb molded body was dried by using a microwave dryer.

Here, the shape of each of the cells on the cross section perpendicular to the longitudinal direction of the honeycomb molded body is a square 1.17 mm on a side in its design value.

(2) By using the opening-sealing apparatus for a honeycomb molded body having a structure shown in FIGS. 4, 5A and 5B, the predetermined cells was filled with a plug material paste having the same composition as the above-mentioned honeycomb molded body. Here, the specification of the following constituent members, which is in common with each of the Examples and Reference examples, is explained as follows:

Temperature of plug material paste: 70° C. (inside the paste discharging vessel)

Viscosity of plug material paste: 42 Pa·s (upon preparation, measurement temperature: 25° C.)

Mono-axial eccentric screw pump: Robo-dispenser 3NDPL06G15, made by Heishin Ltd.

Plug material paste discharging time: 1.6 seconds

Here, Table 1 shows the shape of openings of the opening-sealing mask, the area ratio of the opening of the opening-sealing mask to the cell, the kind of flow regulating plate, the number and the rotating speed of stirring blades, the rotating speed of the mono-axial eccentric screw pump and the amount of filling of the plug material paste.

Figure 9A:
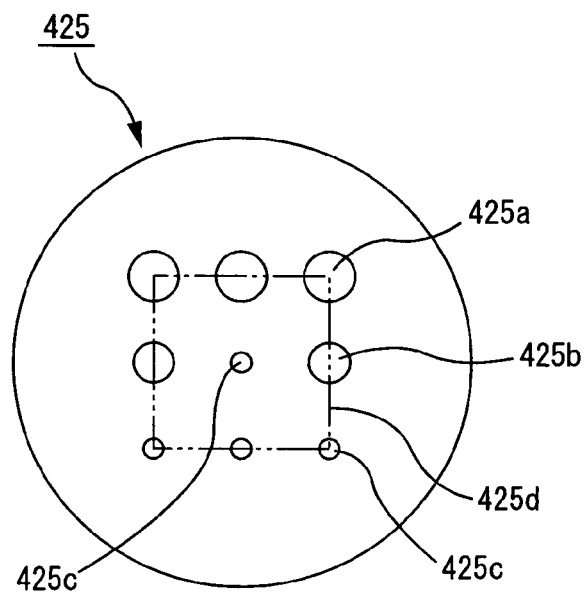
FIGS. 9A and 9B are plan views each of which schematically shows another example of the flow regulating plate that constitutes the opening-sealing apparatus for a honeycomb molded body according to one embodiment of the present invention.
Figure 9B:
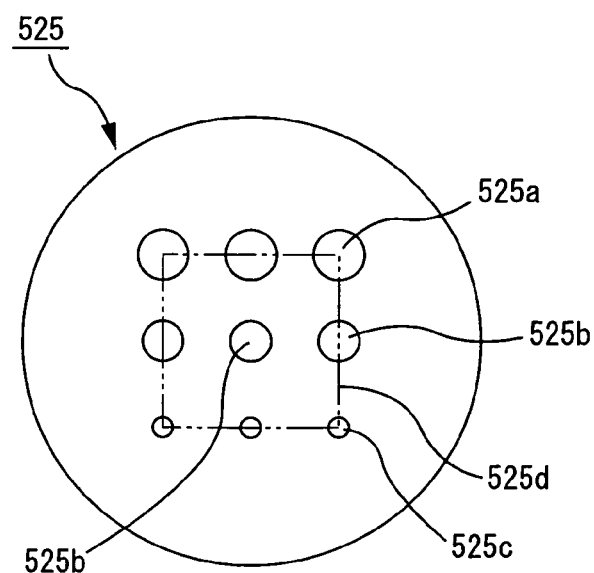

Moreover, in the case where a flow regulating plate was used, any one of the flow regulating plates A to C, shown in FIGS. 7B, 9A and 9B, was used.

In other words, a flow regulating plate A is the flow regulating plate 325 shown in FIG. 7B, which is a flow regulating plate having a structure in which: a hypothetical square 325d, 16 mm on a side, was drawn on the disc-shaped flow regulating plate main body having a thickness of 1 mm and a diameter of 55 mm in such a manner that the center thereof superposes on the center of the flow regulating plate main body, and three large openings 325a were formed with equal intervals on the side located on the top of the hypothetical square 325d, while three small openings 325c were formed with equal intervals on the side located on the bottom, and medium openings 325b were formed on the respective middle points of the two sides located on the sides. Moreover, the diameters of the small openings 325c, the medium openings 325b and the large openings 325a were set to 2 mm, 4 mm and 5 mm, respectively. Here, the hypothetical square 325d was not actually drawn.

Moreover, a flow regulating plate B is the flow regulating plate 425 shown in FIG. 9A having a structure of the flow regulating plate A shown in FIG. 7B, in which a small opening 425c was further formed in the center of the hypothetical square 425d. In the Figure, reference numeral 425a indicates each of the large openings, and reference numeral 425b indicates each of the medium openings.

Furthermore, a flow regulating plate C is the flow regulating plate 525 shown in FIG. 9B having a structure of the flow regulating plate A shown in FIG. 7B, in which a medium opening 525b was further formed in the center of the hypothetical square 525d. In the Figure, reference numeral 525a indicates each of the large openings, and reference numeral 525c indicates each of the small openings.

Figure 2A:
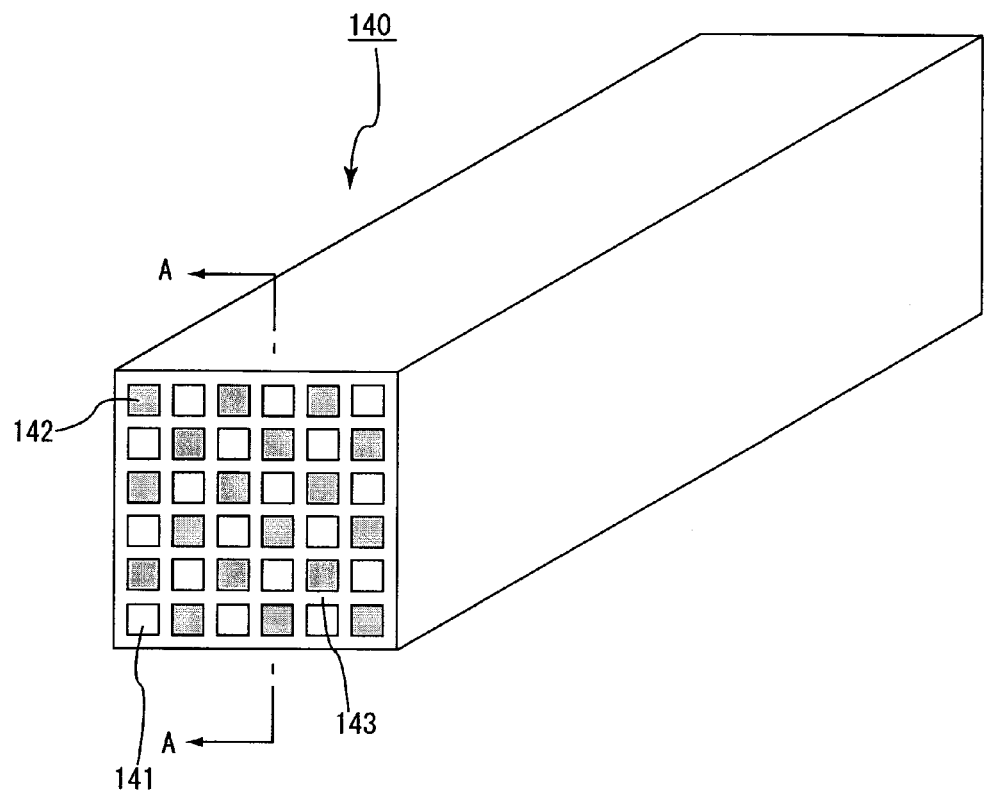
FIG. 2A is a perspective view that schematically shows a honeycomb fired body that constitutes a conventional honeycomb filter.
Figure 2B:
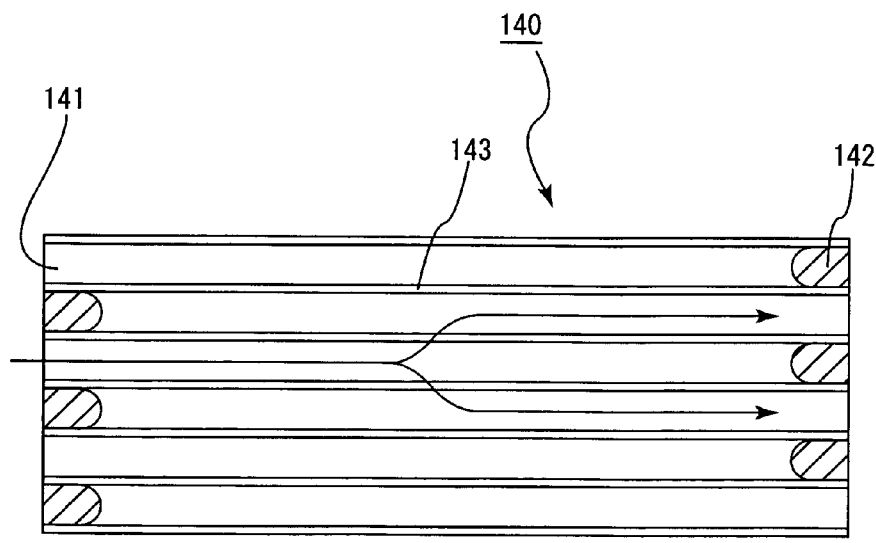
FIG. 2B is a cross-sectional view taken along line A-A of FIG. 2A.

(3) Next, the honeycomb molded body which had been filled with the plug material paste was again dried by using a dryer, and then degreased at 400° C., and fired at 2200° C. for 3 hours under a normal-pressure argon atmosphere so that a honeycomb fired body made of a silicon carbide sintered body with a porosity of 40% and an average pore diameter of 12.5 μm, which had a shape with an opening-sealing material layer being formed on one of the end portion of each cell as shown in FIGS. 2A and 2B, a size of 34.3 mm×34.3 mm×150 mm, the number of cells (cell density) of 49 cells/cm$^2$ and a thickness of the cell wall of 0.25 mm, was manufactured.

(Evaluation of Honeycomb Fired Body)

Each of honeycomb fired bodies thus manufactured was evaluated with respect to the filling property of the plug material paste, based upon the following evaluation items 1 to 4.

(Evaluation 1)

The honeycomb fired body was cut in a manner so as to cross each of the cells, and the length (length in the longitudinal direction) of the opening-sealing material layer was measured on its cut face, and evaluated based upon the following criteria.

◯: The length of the opening-sealing material layer was 1 to 7 mm

Δ: The length of the opening-sealing material layer was less than 1 mm, or more than 7 mm X: There was a cell in which the opening-sealing material layer was not formed in a manner so as to completely seal the cell (Evaluation 2)

With respect to the length of the opening-sealing material layer measured in the same method as evaluation 1, the difference in lengths was evaluated based upon the following criteria. Here, the lengths of the opening-sealing material layer were compared for each of those on the same end face side.

◉: The maximum value of the difference in lengths of the opening-sealing material layer was less than 1 mm ◯: The maximum value of the difference in lengths of the opening-sealing material layer was 1 mm or more, and less than 2 mm Δ: The maximum value of the difference in lengths of the opening-sealing material layer was 2 mm or more, and less than 3 mm X: The maximum value of the difference in lengths of the opening-sealing material layer was 3 mm or more (Evaluation 3)

With respect to the opening-sealing material layer formed thereon, the recess (concave portion) from the end face of the honeycomb fired body was measured by inserting a rod-shaped member with scales on the side face thereof, and evaluated based upon the following criteria.

◯: The recess (concave portion) was less than 1 mm

Δ: The recess (concave portion) was 1 mm or more

X: There was a cell in which the opening-sealing material layer was not formed in a manner so as to completely seal the cell (Evaluation 4)

The end face of the honeycomb fired body was visually observed so as to confirm whether the plug material paste in one cell stuck out to another adjacent cell, and evaluated based upon the following criteria.

◯: No sticking out portion was found

Δ: The plug material paste stuck out in some of the cells

X: The plug material paste stuck out in all the cells

TABLE 1

| | Opening-sealing mask | | Ratio of opening area to cell (%) | Flow regulating plate | Stirring unit | | Rotating speed of mono pump (min$^{-1}$) | Amount of filling per face (g) | Filling property | | | |
|---|---|---|---|---|---|---|---|---|---|---|---|---|
| | Shape of opening | Size (mm) | | | Rotating speed (rpm) | Number of blades | | | Evaluation 1 | Evaluation 2 | Evaluation 3 | Evaluation 4 |
| Example 1 | Round | φ0.7 | 28 | A | 240 | 4 | 135 | 3 | ◯ | ◉ | ◯ | ◯ |
| Example 2 | Round | φ0.6 | 21 | A | 240 | 4 | 135 | 3 | ◯ | ◉ | ◯ | ◯ |
| Example 3 | Round | φ0.5 | 14 | A | 240 | 4 | 135 | 2.75 | ◯ | ◉ | ◯ | ◯ |
| Example 4 | Round | φ0.3 | 5 | A | 240 | 4 | 135 | 2.5 | ◯ | ◉ | ◯ | ◯ |

TABLE 1-continued

| | Opening-sealing mask | | Ratio of opening | Flow regulating plate | Stirring unit | | Rotating speed of mono pump ($min^{-1}$) | Amount of filling per face (g) | Filling property | | | |
|---|---|---|---|---|---|---|---|---|---|---|---|---|
| | Shape of opening | Size (mm) | area to cell (%) | | Rotating speed (rpm) | Number of blades | | | Evaluation 1 | Evaluation 2 | Evaluation 3 | Evaluation 4 |
| Example 5 | Round | φ0.7 | 28 | A | 240 | 4 | 145 | 4 | ◯ | ◎ | ◯ | ◯ |
| Example 6 | Round | φ0.7 | 28 | A | 240 | 4 | 110 | 2.5 | ◯ | ◎ | ◯ | ◯ |
| Example 7 | Round | φ0.7 | 28 | A | 160 | 4 | 135 | 2.5 | ◯ | ◎ | ◯ | ◯ |
| Example 8 | Round | φ0.7 | 28 | B | 240 | 4 | 135 | 3 | ◯ | ◯ | ◯ | ◯ |
| Reference Example 1 | Round | φ0.25 | 3.5 | A | 240 | 4 | 135 | 2 | Δ | ◎ | ◯ | ◯ |
| Reference Example 2 | Round | φ0.8 | 37 | A | 240 | 4 | 135 | 4.5 | ◯ | ◯ | ◯ | Δ |
| Reference Example 3 | Round | φ0.7 | 28 | C | 240 | 4 | 135 | 3.25 | ◯ | Δ | ◯ | ◯ |
| Reference Example 4 | Round | φ0.7 | 28 | A | 240 | 2 | 135 | 3 | ◯ | Δ | ◯ | ◯ |
| Reference Example 5 | Round | φ0.7 | 28 | A | 300 | 4 | 135 | 4.5 | ◯ | ◎ | Δ | ◯ |
| Reference Example 6 | Round | φ0.7 | 28 | A | 120 | 4 | 135 | 3 | ◯ | Δ | ◯ | ◯ |
| Reference Example 7 | Round | φ0.7 | 28 | A | 240 | 4 | 160 | 6 | ◯ | ◯ | Δ | Δ |
| Reference Example 8 | Round | φ0.7 | 28 | A | 240 | 4 | 90 | 1.75 | X | — | X | ◯ |
| Reference Example 9 | Round | φ0.7 | 28 | None | 240 | 4 | 135 | 5 | Δ | X | ◯ | Δ |
| Reference Example 10 | Round | φ0.7 | 28 | A | 240 | 0 | 135 | 3 | ◯ | X | ◯ | ◯ |
| Reference Example 11 | Round | φ0.7 | 28 | A | 80 | 4 | 135 | 3 | ◯ | X | ◯ | ◯ |

As clearly indicated by the results shown in Table 1, the honeycomb fired bodies according to Examples 1 to 7 were superior in all the results of evaluation on the filling properties according to Evaluations 1 to 4.

Moreover, with respect to the honeycomb fired body according to Example 8, although the results in Evaluation 2 were slightly inferior to those of the honeycomb fired bodies according to the other Examples, the filling property thereof was generally good.

In contrast, in the honeycomb fired body according to Reference example 1, the length of the opening-sealing material layer was shorter than those of the honeycomb fired bodies according to Examples. This is presumably because the ratio of the area occupied by the openings of the opening-sealing mask was in a small level of less than about 5%.

In the honeycomb fired body according to Reference example 2, the plug material paste stuck out to another adjacent cell in some of the cells. This is presumably because the ratio of the area occupied by the openings of the opening-sealing mask was more than about 35%.

In the honeycomb fired body according to Reference example 3, deviation in the length of the opening-sealing material layer was larger in comparison with the honeycomb fired bodies according to Examples. More specifically, the length of the opening-sealing material layer formed on the cells in the vicinity of the center of the end face of the honeycomb fired body was longer than the length of the opening-sealing material layer formed on the cells in the vicinity of the periphery of the end face. This is presumably because the flow regulating plate C, that is, the flow regulating plate in which an opening was also formed in the center portion, was used.

In the honeycomb fired body according to Reference example 4, deviation in the length of the opening-sealing material layer was larger in comparison with the honeycomb fired bodies according to Examples. More specifically, the length of the opening-sealing material layer formed on the cells in the vicinity of the center of the end face of the honeycomb fired body was shorter than the length of the opening-sealing material layer formed on the cells in the vicinity of the periphery of the end face. This is presumably because the number of stirring blades was small, resulting in that the plug material paste was not sufficiently stirred in the paste discharging vessel.

In the honeycomb fired body according to Reference example 5, the recess (concave portion) of the opening-sealing material layer formed on each of the cells formed in the vicinity of the center portion of the end face of the honeycomb fired body was large. This is presumably because the rotation speed of the stirring blades was high, with the result that the viscosity of the plug material paste was lowered to cause a reduction in the shape retaining property of the plug material paste in the cells.

In the honeycomb fired body according to Reference example 6, deviation in the length of the opening-sealing material layer was larger in comparison with the honeycomb fired bodies according to Examples. More specifically, the length of the opening-sealing material layer formed on the cells in the vicinity of the center of the end face of the honeycomb fired body was shorter than the length of the opening-sealing material layer formed on the cells in the vicinity of the periphery of the end face. This is presumably because the rotation speed of the stirring blades was low, with the result that deviations occurred in the viscosity of the plug material paste in the paste discharging vessel.

In the honeycomb fired body according to Reference example 7, the recess (concave portion) of the opening-sealing material layer formed on each of the cells formed in the vicinity of the center portion of the end face of the honeycomb fired body was large. This is presumably because, in proportion to the high rotating speed of the mono-axial eccentric screw pump, the amount of the plug material paste to be discharged from the paste discharging vessel became greater, and because the cells formed in the vicinity of the center portion of the end face of the honeycomb molded body, where the cells were rather easily filled with the plug material paste, were filled with a larger amount of the plug material paste, the plug material paste was hardly dried, resulting in a larger recess (concave portion) after the firing process.

Moreover, in the honeycomb fired body according to Reference example 7, since the amount of the plug material paste to be discharged from the paste discharging vessel became greater as described above, the plug material paste sticking out to another adjacent cell was observed.

In the honeycomb fired body according to Reference example 8, the observation found that there were cells in which the opening-sealing material layer was not formed in a manner so as to completely seal the cells. This is presumably because the rotating speed of the mono-axial eccentric screw pump was low, and thus the amount of the plug material paste to be discharged from the paste discharging vessel was small.

Here, in the honeycomb fired body according to the present Reference example, since there was a cell in which the opening-sealing material layer was not completely formed, the difference in lengths of the opening-sealing material layer was not calculated.

In the honeycomb fired body according to Reference example 9, upon filling the cells with the plug material paste, there was a big difference of 3 mm or more in the lengths of the opening-sealing material layer, between cells located on the upper part and cells located on the lower part. This is presumably because, since no flow regulating plate was placed, the plug material paste was more easily allowed to flow into the cells located in the lower part due to the action of gravity. In addition, in the honeycomb fired body according to the present Reference example, the length of the opening-sealing material layer of the cells located in the lower part was as long as 7 mm or more.

In the honeycomb fired body according to Reference example 10, deviation in the length of the opening-sealing material layer was larger in comparison with the honeycomb fired bodies according to Examples. More specifically, the length of the opening-sealing material layer formed on the cells in the vicinity of the center of the end face of the honeycomb fired body was shorter than the length of the opening-sealing material layer formed on the cells formed in the vicinity of the upper part of the end face by 3 mm or more. This is presumably because the stirring unit had no stirring blades, under the condition that the plug material paste was hardly supplied to the center portion of the honeycomb molded body because of the flow regulating plate A used therein, the plug material paste was not sufficiently stirred in the paste discharging vessel, with a result that the heat was hardly transmitted downward, causing a reduction in the flowability.

In the honeycomb fired body according to Reference example 11, the maximum value of the difference in lengths of the opening-sealing material layer was greater than that of the honeycomb fired body according to Examples. More specifically, the length of the opening-sealing material layer formed on the cells in the vicinity of the center of the end face of the honeycomb fired body was shorter than the length of the opening-sealing material layer formed on the cells in the vicinity of the peripheral portion of the end face by 3 mm or more. This is presumably because, since the rotation speed of the stirring blades was very slow, deviation in the viscosity of the plug material paste, caused in the paste discharging vessel, became greater.

Examples 9 to 11, Reference Examples 12, 13

(1) The same processes as those of Example 1 were carried out to prepare a wet mixture.

Next, this wet mixture was subjected to an extrusion molding process and successively to a cutting process to prepare a honeycomb molded body. Thereafter, the honeycomb molded body was dried by using a microwave dryer.

Here, the shape of the cross section perpendicular to the longitudinal direction of the cells of the honeycomb molded body was a square 1.49 mm on a side in its design value.

(2) Next, by using the opening-sealing apparatus for a honeycomb molded body having the structure shown in FIGS. 4, 5A and 5B, the predetermined cells were filled with the plug material paste having the same composition as the honeycomb molded body. Here, the specifications, such as the temperature of the plug material paste, the viscosity of the plug material paste, the kind and the rotating speed of the mono-axial eccentric screw pump, the discharging time of the plug material paste, the kind of the flow regulating plate, and the number and the rotating speed of the stirring blades, were the same as Example 1.

Moreover, the shape of openings of the opening-sealing mask, the area ratio of the openings of the opening-sealing mask to the cells, and the amount of filling of the plug material paste are shown in Table 2.

Each of the openings of the opening-sealing mask used in Examples 9 to 11 and Reference examples 12 and 13 has a square shape with R-chamfered corners by 0.2 mm at each of the vertexes thereof or a round shape. The length of one side of the square or the diameter is mentioned in Table 2.

(3) Next, the honeycomb molded body which had been filled with the plug material paste was again dried by using a dryer, and then degreased at 400° C., and fired at 2200° C. for 3 hours under a normal-pressure argon atmosphere so that a honeycomb fired body made of a silicon carbide sintered body with a porosity of 40% and an average pore diameter of 12.5 μm, which had a shape with an opening-sealing material layer being formed on one of the end portion of each cell, a size of 34.3 mm×34.3 mm×150 mm, the number of cells (cell density) of 28 cells/cm$^2$ and a thickness of the cell wall of 0.4 mm, was manufactured.

With respect to the honeycomb fired bodies manufactured in Examples 9 to 11 and Reference examples 12 and 13, the filling property of the plug material paste was evaluated in the same manner as Example 1. The results are shown in Table 2.

TABLE 2

| | Opening-sealing mask | | Ratio of opening area to cell (%) | Flow regulating plate | Stirring unit | | Rotating speed of mono pump (min$^{-1}$) | Amount of filling per face (g) | Filling property | | | |
|---|---|---|---|---|---|---|---|---|---|---|---|---|
| | Shape of opening | Size (mm) | | | Rotating speed (rpm) | Number of blades | | | Evaluation 1 | Evaluation 2 | Evaluation 3 | Evaluation 4 |
| Example 9 | R-chamfered square | φ0.8 | 27 | A | 240 | 4 | 135 | 3 | ○ | ◎ | ○ | ○ |
| Example 10 | R-chamfered square | φ0.6 | 15 | A | 240 | 4 | 135 | 2.75 | ○ | ◎ | ○ | ○ |
| Example 11 | Round | φ0.4 | 6 | A | 240 | 4 | 135 | 2.5 | ○ | ◎ | ○ | ○ |
| Reference Example 12 | Round | φ0.3 | 3 | A | 240 | 4 | 135 | 2 | △ | ◎ | ○ | ○ |
| Reference Example 13 | R-chamfered square | φ1 | 43 | A | 240 | 4 | 135 | 4.75 | ○ | ○ | ○ | △ |

As clearly indicated by the results shown in Table 2, the honeycomb fired bodies according to Examples 9 to 11 were superior in all the results of evaluation on the filling properties according to Evaluations 1 to 4.

In contrast, in the honeycomb fired body according to Reference example 12, the length of the opening-sealing material layer was less than 1 mm in some of the cells, which was shorter than that of the honeycomb fired bodies of Examples. This is presumably because the ratio of the area occupied by the openings of the opening-sealing mask was as small as less than about 5%.

Moreover, in the honeycomb fired body according to Reference example 13, the results according to Evaluation 2 were slightly inferior to those of the honeycomb fired bodies of Examples, and furthermore, the plug material paste stuck out to another adjacent cell in some of the cells. This is presumably because the ratio of the area occupied by the openings of the opening-sealing mask was more than about 35%.

Examples 12 to 14, Reference Examples 14 and 15

(1) The same processes as those of Example 1 were carried out to prepare a wet mixture.

Next, this wet mixture was subjected to an extrusion molding process and successively to a cutting process to manufacture a honeycomb molded body. Thereafter, the honeycomb molded body was dried by using a microwave dryer.

Here, the shape of the cross section of each cell perpendicular to the longitudinal direction of the honeycomb molded body was a shape shown in FIG. 3-2, that is, each large cell had an octagonal shape, and each small cell had a square shape, and with respect of the large cell, the length of the longer side (portion A, in FIG. 3-2) was 1.08 mm and the length of the shorter side (portion B, in FIG. 3-2) was 0.5 mm, and with respect of the small cell, the length of each side (portion C, in FIG. 3-2) was 1.08 mm. Here, all the numeric values were design values.

(2) Next, by using the opening-sealing apparatus for a honeycomb molded body having the structure shown in FIGS. 4, 5A and 5B, in the predetermined cells were filled with the plug material paste having the same composition as the honeycomb molded body. Here, the specifications, such as the temperature of the plug material paste, the viscosity of the plug material paste, the kind and the rotating speed of the mono-axial eccentric screw pump, the discharging time of the plug material paste, the kind of the flow regulating plate, and the number and the rotating speed of the stirring blades, were the same as Example 1.

Moreover, the shape of openings of the opening-sealing mask, the area ratio of the openings of the opening-sealing mask to the cells, and the amount of filling of the plug material paste at the respective end faces of the honeycomb molded body are shown in Table 3.

Each of the openings of the opening-sealing mask used in Examples 12 to 14 and Reference Examples 14 and 15 has a square shape with R-chamfered corners by 0.2 mm at each of the vertexes thereof or a round shape. The length of one side of the square or the diameter is mentioned in Table 3.

(3) Next, the honeycomb molded body which had been filled with the plug material paste was again dried by using a dryer, and then degreased at 400° C., and fired at 2200° C. for 3 hours under a normal-pressure argon atmosphere so that a honeycomb fired body made of a silicon carbide sintered body with a porosity of 40% and an average pore diameter of 12.5 μm, which had a shape with an opening-sealing material layer being formed on one of the end portion of each cell, a size of 34.3 mm×34.3 mm×150 mm, the number of cells (cell density) of 25 cells/cm$^2$ and a thickness of the cell wall of 0.4 mm, was manufactured.

With respect to the honeycomb fired bodies manufactured in Examples 12 to 14 and Reference examples 14 and 15, the filling property of the plug material paste was evaluated in the same manner as Example 1. The results are shown in Table 3.

TABLE 3

| | Opening-sealing mask (large cell side) | | Ratio of opening | Opening-sealing mask (small cell side) | | Ratio of opening | Flow regulating plate | Stirring unit | | Rotating speed of mono pump (min−1) | Filling amount (g) | | Filling property | | | |
|---|---|---|---|---|---|---|---|---|---|---|---|---|---|---|---|---|
| | Shape of opening | Size (mm) | area to cell (%) | Shape of opening | Size (mm) | area to cell (%) | | Rotating speed (rpm) | Number of blades | | Large cell side | Small cell side | Evaluation 1 | Evaluation 2 | Evaluation 3 | Evaluation 4 |
| Example 12 | R-chamfered square | φ1 | 33 | R-chamfered square | φ0.6 | 28 | A | 240 | 4 | 135 | 4.6 | 1.9 | ○ | ⊙ | ○ | ○ |
| Example 13 | R-chamfered square | φ0.8 | 20 | Round | φ0.4 | 11 | A | 240 | 4 | 135 | 4.3 | 1.7 | ○ | ⊙ | ○ | ○ |
| Example 14 | R-chamfered square | φ0.6 | 11 | Round | φ0.3 | 5 | A | 240 | 4 | 135 | 3.9 | 1.6 | ○ | ⊙ | ○ | ○ |
| Reference Example 14 | Round | φ0.4 | 4 | Round | φ0.25 | 2.4 | A | 240 | 4 | 135 | 2.8 | 1.2 | Δ | ⊙ | ○ | ○ |
| Reference Example 15 | R-chamfered square | φ1.2 | 47 | R-chamfered square | φ0.7 | 39 | A | 240 | 4 | 135 | 7.1 | 2.9 | ○ | ○ | ○ | ○ |

As clearly indicated by the results shown in Table 3, the honeycomb fired bodies according to Examples 12 to 14 were superior in all the results of evaluation on the filling properties according to Evaluations 1 to 4.

In contrast, in the honeycomb fired body according to Reference example 14, the length of the opening-sealing material layer was less than 1 mm in some of the cells, which was shorter than that of the honeycomb fired bodies of Examples. This is presumably because the ratio of the area occupied by the openings of the opening-sealing mask was as small as less than about 5%.

Moreover, in the honeycomb fired body according to Reference example 15, the results according to Evaluation 2 were slightly inferior to those of the honeycomb fired bodies of Examples. This is presumably because the ratio of the area occupied by the openings of the opening-sealing mask was more than about 35%.

What is claimed as new and desired to be secured by Letters Patent of the United States is:

1. A method of filling a plug material paste, comprising:
   obtaining a honeycomb structure comprising a plurality of cells extending along a longitudinal direction of the honeycomb structure;
   imaging an end face of said honeycomb structure, wherein the end face comprises a plurality of cell openings;
   identifying a plurality of first openings among the plurality of cell openings to be filled with the plug material paste;
   determining a coordinate of a first center of gravity for each of the first openings;
   obtaining an opening-sealing mask comprising a plurality of second openings, wherein the number of the first openings corresponds to the number of the second openings;
   determining a coordinate of a second center of gravity for each of the plurality of second openings;
   selecting a number of the first centers of gravity and a corresponding number of the second centers of gravity wherein all of the first openings except those located within two rows at the periphery of the honeycomb structure and a corresponding number of second openings are selected;
   calculating a value of deviation between the coordinates of selected first centers of gravity for the plurality of first openings and the coordinates of selected second centers of gravity for the plurality of second openings using the method of least squares;
   comparing the value of deviation with a predetermined value;
   designating the honeycomb structure as defective when the value of deviation is larger than the predetermined value and designating the honeycomb structure as non-defective when the value of deviation is equal or smaller than the predetermined value;
   subjecting the honeycomb structure determined as non-defective to subsequent steps of the method of filling a plug material paste;
   shifting the position of the opening-sealing mask to align each of the plurality of second openings with each of the plurality of first openings of the honeycomb structure determined as non-defective so that the value of deviation is minimized; and
   injecting the plug material paste into the first openings through said second openings in an alternately plugged manner over the entire end face of the honeycomb structure.

2. The method of claim 1, further comprising:
   imaging an end face of a master work, wherein the end face comprises a plurality of bottom holes; and
   establishing a coordinate based on the positions of the bottom holes.

3. The method of claim 2, wherein the coordinates of the second centers of gravity are obtained in the coordinates established based on the positions of the bottom holes.

4. The method of claim 1, wherein the method is applied to both end faces of the honeycomb structure.

5. The method of claim 1, wherein the temperature of the material paste is controlled in a range of at least about 30° C. and at most about 110° C.

6. The method of claim 1, wherein the honeycomb structure is a honeycomb molded body manufactured by molding a ceramic material.

7. The method of claim 1, wherein the honeycomb structure is a honeycomb fired body.

8. The method of claim 1, wherein the size of a second opening is smaller than the size of a first opening.

9. The method of claim 8, wherein the opening area of said second opening is at least about 5% and at most about 35% of the opening area of said first opening.

10. The method of claim 1, wherein the shape of said second opening is circular.

11. A method of manufacturing a honeycomb structured body, comprising:
- molding a ceramic material to manufacture a pillar-shaped honeycomb molded body comprising a plurality of cells extending along a longitudinal direction of the honeycomb molded body;
- imaging an end face of said honeycomb molded body, wherein the end face comprises a plurality of cell openings;
- identifying a plurality of first openings among the plurality of cell openings to be filled with the plug material paste;
- determining a coordinate of a first center of gravity for each of the first openings;
- obtaining an opening-sealing mask comprising a plurality of second openings, wherein the number of the first openings corresponds to the number of the second openings;
- determining a coordinate of a second center of gravity for each of the plurality of second openings;
- selecting a number of the first centers of gravity and a corresponding number of the second centers of gravity, wherein all of the first openings except those located within two rows at the periphery of the honeycomb molded body and a corresponding number of second openings are selected;
- calculating a value of deviation between the coordinates of selected first centers of gravity for the plurality of first openings and the coordinates of selected second centers of gravity for the plurality of second openings using the method of least squares;
- comparing the value of deviation with a predetermined value;
- designating the honeycomb molded body as defective when the value of deviation is larger than the predetermined value and designating the honeycomb molded body as non-defective when the value of deviation is equal or smaller than the predetermined value;
- subjecting the honeycomb molded body determined as non-defective to subsequent steps of the method of filling a plug material paste;
- shifting the position of the opening-sealing mask to align each of the plurality of second openings with each of the plurality of first openings of the honeycomb molded body determined as non-defective so that the value of deviation is minimized; and
- injecting the plug material paste into the first openings through said second openings in an alternately plugged manner over the entire end face of the honeycomb molded body; and
- firing the honeycomb molded body to manufacture a honeycomb structured body having the resulting honeycomb fired body.

12. The method of claim 11, further comprising:
- imaging an end face of a master work, wherein the end face comprises a plurality of bottom holes; and
- establishing a coordinate based on the positions of the bottom holes.

13. The method of claim 12, wherein the coordinates of the second centers of gravity are obtained in the coordinates established based on the positions of the bottom holes.

14. The method of claim 11, wherein the method is applied to both end faces of the honeycomb molded body.

15. The method of claim 11, wherein the temperature of the material paste is controlled in a range of at least about 30° C. and at most about 110° C.

16. The method of claim 11, wherein the size of a second opening is smaller than the size of a first opening.

17. The method of claim 16, wherein the opening area of said second opening is at least about 5% and at most about 35% of the opening area of said first opening.

18. The method of claim 11, wherein the shape of said second opening is circular.

19. The method of claim 11, further comprising binding a plurality of said honeycomb fired bodies by interposing an adhesive layer between adjacent honeycomb fired bodies.

20. The method of claim 11, wherein said honeycomb structured body is formed by one honeycomb fired body.

21. A method of manufacturing a honeycomb structured body, comprising:
- molding a ceramic material to manufacture a pillar-shaped honeycomb molded body comprising a plurality of cells extending along a longitudinal direction of the honeycomb molded body;
- firing said honeycomb molded body to manufacture a honeycomb fired body;
- imaging an end face of said honeycomb fired body, wherein the end face comprises a plurality of cell openings;
- identifying a plurality of first openings among the plurality of cell openings to be filled with the plug material paste;
- determining a coordinate of a first center of gravity for each of the first openings;
- obtaining an opening-sealing mask comprising a plurality of second openings, wherein the number of the first openings corresponds to the number of the second openings;
- determining a coordinate of a second center of gravity for each of the plurality of second openings;
- selecting a number of the first centers of gravity and a corresponding number of the second centers of gravity, wherein all of the first openings except those located within two rows at the periphery of the honeycomb fired body and a corresponding number of second openings are selected;
- calculating a value of deviation between the coordinates of selected first centers of gravity for the plurality of first openings and the coordinates of selected second centers of gravity for the plurality of second openings using the method of least squares;
- comparing the value of deviation with a predetermined value;
- designating the honeycomb fired body as defective when the value of deviation is larger than the predetermined value and designating the honeycomb fired body as non-defective when the value of deviation is equal or smaller than the predetermined value;
- subjecting the honeycomb fired body determined as non-defective to subsequent steps of the method of filling a plug material paste;
- shifting the position of the opening-sealing mask to align each of the plurality of second openings with each of the plurality of first openings of the honeycomb fired body determined as non-defective so that the value of deviation is minimized;

injecting the plug material paste into the first openings through said second openings in an alternately plugged manner over the entire end face of the honeycomb fired body; and further firing or drying said honeycomb fired body to manufacture a honeycomb structured body.

22. The method of claim 21, further comprising:

imaging an end face of a master work, wherein the end face comprises a plurality of bottom holes; and establishing a coordinate based on the positions of the bottom holes.

23. The method of claim 22, wherein the coordinates of the second centers of gravity are obtained in the coordinates established based on the positions of the bottom holes.

24. The method of claim 21, wherein the method is applied to both end faces of the honeycomb fired body.

25. The method of claim 21, wherein the temperature of the material paste is controlled in a range of at least about 30° C. and at most about 110° C.

26. The method of claim 21, wherein the size of a second opening is smaller than the size of a first opening.

27. The method of claim 26, wherein the opening area of said second opening is at least about 5% and at most about 35% of the opening area of said first opening.

28. The method of claim 21, wherein the shape of said second opening is circular.

29. The method of claim 21, further comprising binding a plurality of said honeycomb fired bodies by interposing an adhesive layer between adjacent honeycomb fired bodies.

30. The method of claim 21, wherein said honeycomb structured body is formed by one honeycomb fired body.

* * * * *